United States Patent
Kijima et al.

(10) Patent No.: US 8,197,342 B2
(45) Date of Patent: Jun. 12, 2012

(54) GAME SYSTEM, PROGRAM, INFORMATION STORAGE MEDIUM, AND METHOD OF CONTROLLING GAME SYSTEM

(75) Inventors: Takeharu Kijima, Kawasaki (JP); Maki Ono, Yokohama (JP); Satoshi Imashiro, Yokohama (JP)

(73) Assignee: NAMCO BANDAI Games Inc., Tokyo (JP)

( * ) Notice: Subject to any disclaimer, the term of this patent is extended or adjusted under 35 U.S.C. 154(b) by 1056 days.

(21) Appl. No.: 12/081,843

(22) Filed: Apr. 22, 2008

(65) Prior Publication Data
US 2008/0261691 A1    Oct. 23, 2008

(30) Foreign Application Priority Data
Apr. 23, 2007   (JP) ................................. 2007-113001

(51) Int. Cl.
*A63F 13/00* (2006.01)

(52) U.S. Cl. .............................. 463/37; 463/33; 463/36

(58) Field of Classification Search .................... 463/36, 463/37, 43, 46, 31
See application file for complete search history.

(56) References Cited

U.S. PATENT DOCUMENTS

| | | | |
|---|---|---|---|
| 4,542,903 A * | 9/1985 | Yokoi et al. ..................... | 463/31 |
| 6,347,998 B1 * | 2/2002 | Yoshitomi et al. ............... | 463/42 |
| 6,450,888 B1 * | 9/2002 | Takase et al. .................... | 463/43 |
| 6,582,309 B2 | 6/2003 | Higurashi et al. | |
| 7,578,742 B2 * | 8/2009 | Miyamoto et al. .............. | 463/37 |
| 7,750,893 B2 * | 7/2010 | Hashimoto et al. ............. | 345/173 |
| 2005/0176486 A1 * | 8/2005 | Nishimura et al. .............. | 463/4 |
| 2006/0094502 A1 * | 5/2006 | Katayama et al. .............. | 463/31 |

FOREIGN PATENT DOCUMENTS

JP    B1-3031676    2/2000

* cited by examiner

*Primary Examiner* — James S McClellan
(74) *Attorney, Agent, or Firm* — Oliff & Berridge, PLC

(57) ABSTRACT

A game system accepts a position designation operation performed for an operation area OA as a first input operation, and performs game calculations. In this game system, a disturbance area DA is set in the operation area OA when a given disturbance condition has been satisfied. A position designation operation performed for the disturbance area DA is not accepted as a first input operation. The disturbance area DA is canceled when a given cancellation condition has been satisfied.

18 Claims, 13 Drawing Sheets

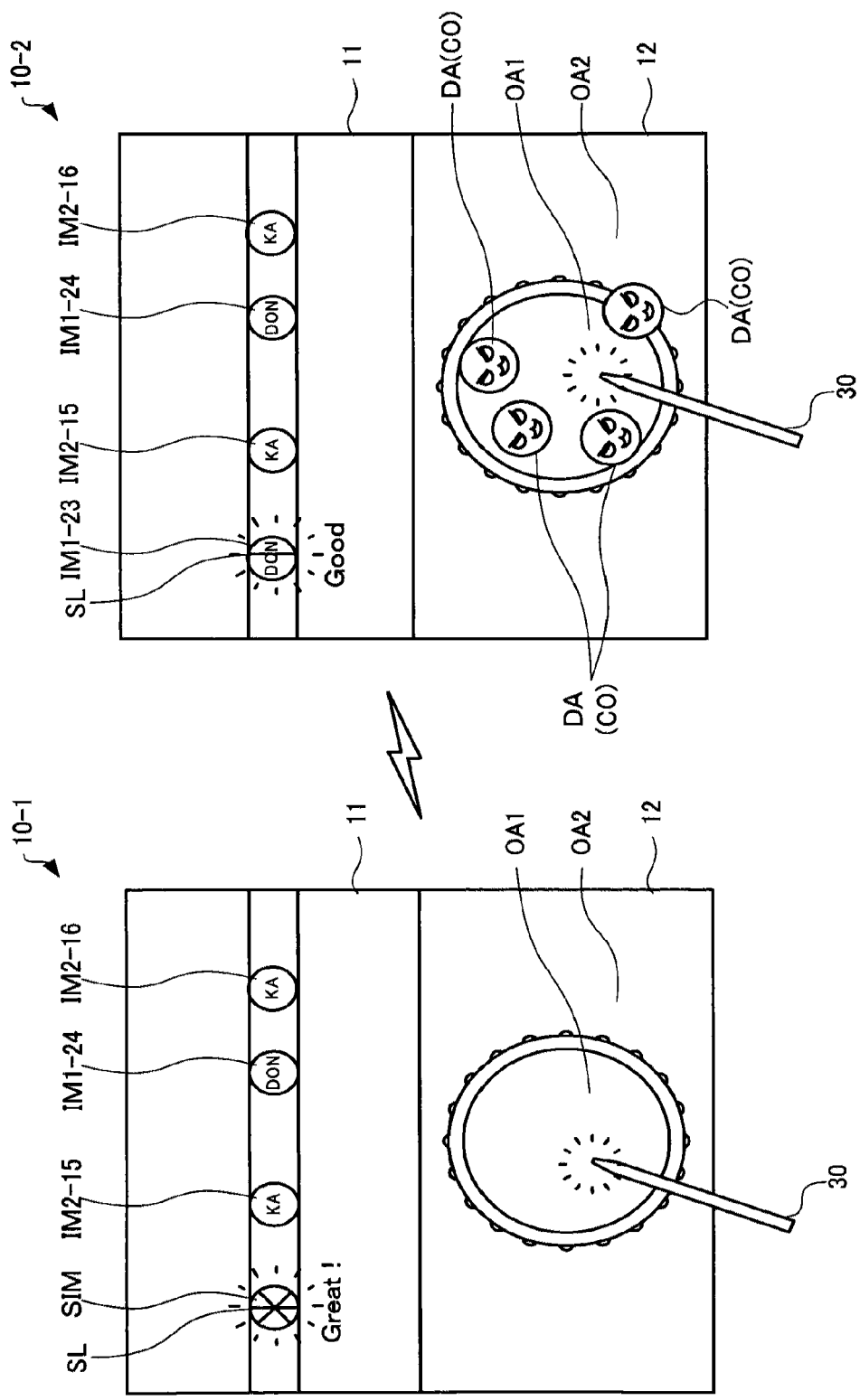

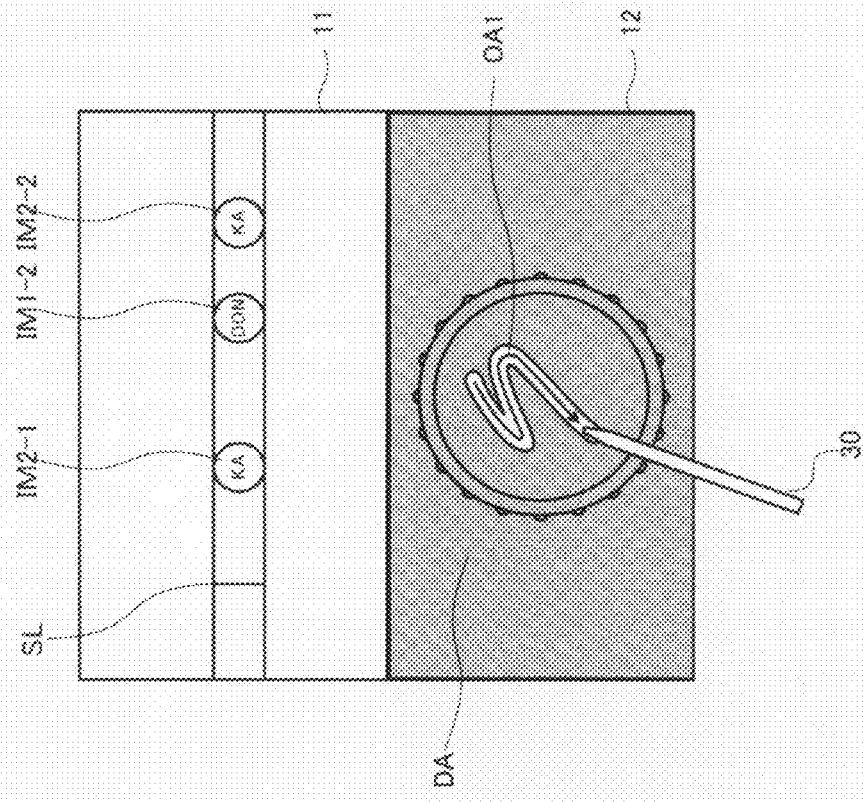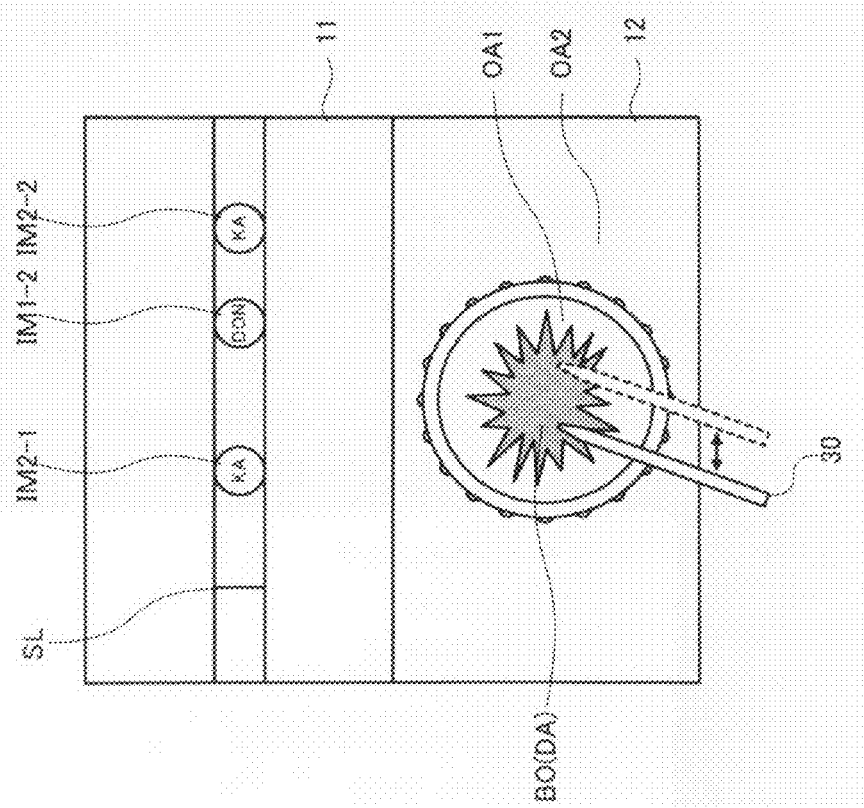

GAME SYSTEM, PROGRAM, INFORMATION STORAGE MEDIUM, AND METHOD OF CONTROLLING GAME SYSTEM

Japanese Patent Application No. 2007-113001, filed on Apr. 23, 2007, is hereby incorporated by reference in its entirety.

BACKGROUND OF THE INVENTION

The present invention relates to a game system, a program, an information storage medium, and a method of controlling a game system.

A music game system has been known which allows the player to perform an ON/OFF operation of a button or the like at a timing in synchronization with music. In such a music game system, a predetermined mark is moved so that the mark is positioned on a reference line in a display area at a timing corresponding to the music to provide the player with an operation timing in synchronization with the music. Such a music game system may produce a disturbance effect which hinders the player determining the operation timing in order to increase game playability (see Japanese Patent No. 3031676).

Since a related-art music game system hinders the player determining the ON/OFF operation timing utilizing an image, the above method may not hinder the operation of a player who determines the operation timing based on the music instead of an operation timing instruction image.

SUMMARY

According to a first aspect of the invention, there is provided a program causing a computer to function as:

a display control section which performs a first display control process which displays an image for proceeding with a game in a first display area, and a second display control process which displays an image that indicates an operation area for which a player should perform a position designation operation in a second display area;

an input processing section which accepts the position designation operation performed for the operation area as a first input operation;

a game calculation section which performs game calculations based on the first input operation which has been accepted by the input processing section; and a disturbance area setting section which sets a disturbance area in the operation area when a given disturbance condition has been satisfied, wherein the input processing section does not accept the position designation operation performed for the disturbance area as the first input operation.

According to a second aspect of the invention, there is provided a program causing a computer to function as:

a display control section which performs a first display control process which displays an image for proceeding with a game in a first display area, and a second display control process which displays an image that indicates an operation area for which a player should perform a position designation operation in a second display area;

an input processing section which accepts the position designation operation performed for the operation area as a first input operation;

a game calculation section which performs game calculations based on the first input operation which has been accepted by the input processing section; and an operation area setting section which moves the operation area when a given disturbance condition has been satisfied.

According to a third aspect of the invention, there is provided a computer-readable information storage medium storing any of the above-described programs.

According to a fourth aspect of the invention, there is provided a game system comprising:

a display control section which performs a first display control process which displays an image for proceeding with a game in a first display area, and a second display control process which displays an image that indicates an operation area for which a player should perform a position designation operation in a second display area;

an input processing section which accepts the position designation operation performed for the operation area as a first input operation;

a game calculation section which performs game calculations based on the first input operation which has been accepted by the input processing section; and a disturbance area setting section which sets a disturbance area in the operation area when a given disturbance condition has been satisfied, wherein the input processing section does not accept the position designation operation performed for the disturbance area as the first input operation.

According to a fifth aspect of the invention, there is provided a method of controlling a game system comprising:

causing a display control section to perform a first display control process which displays an image for proceeding with a game in a first display area, and a second display control process which displays an image that indicates an operation area for which a player should perform a position designation operation in a second display area;

causing an input processing section to accept the position designation operation performed for the operation area as a first input operation;

causing a game calculation section to perform game calculations based on the accepted first input operation; and causing a disturbance area setting section to set a disturbance area in the operation area when a given disturbance condition has been satisfied, wherein the input processing section does not accept the position designation operation performed for the disturbance area as the first input operation.

BRIEF DESCRIPTION OF THE SEVERAL VIEWS OF THE DRAWING

FIG. 4 is a diagram showing an example of an image displayed according to one embodiment of the invention.

FIGS. 10A and 10B are diagrams showing a modification of one embodiment of the invention.

DETAILED DESCRIPTION OF THE EMBODIMENT

Figure 1:
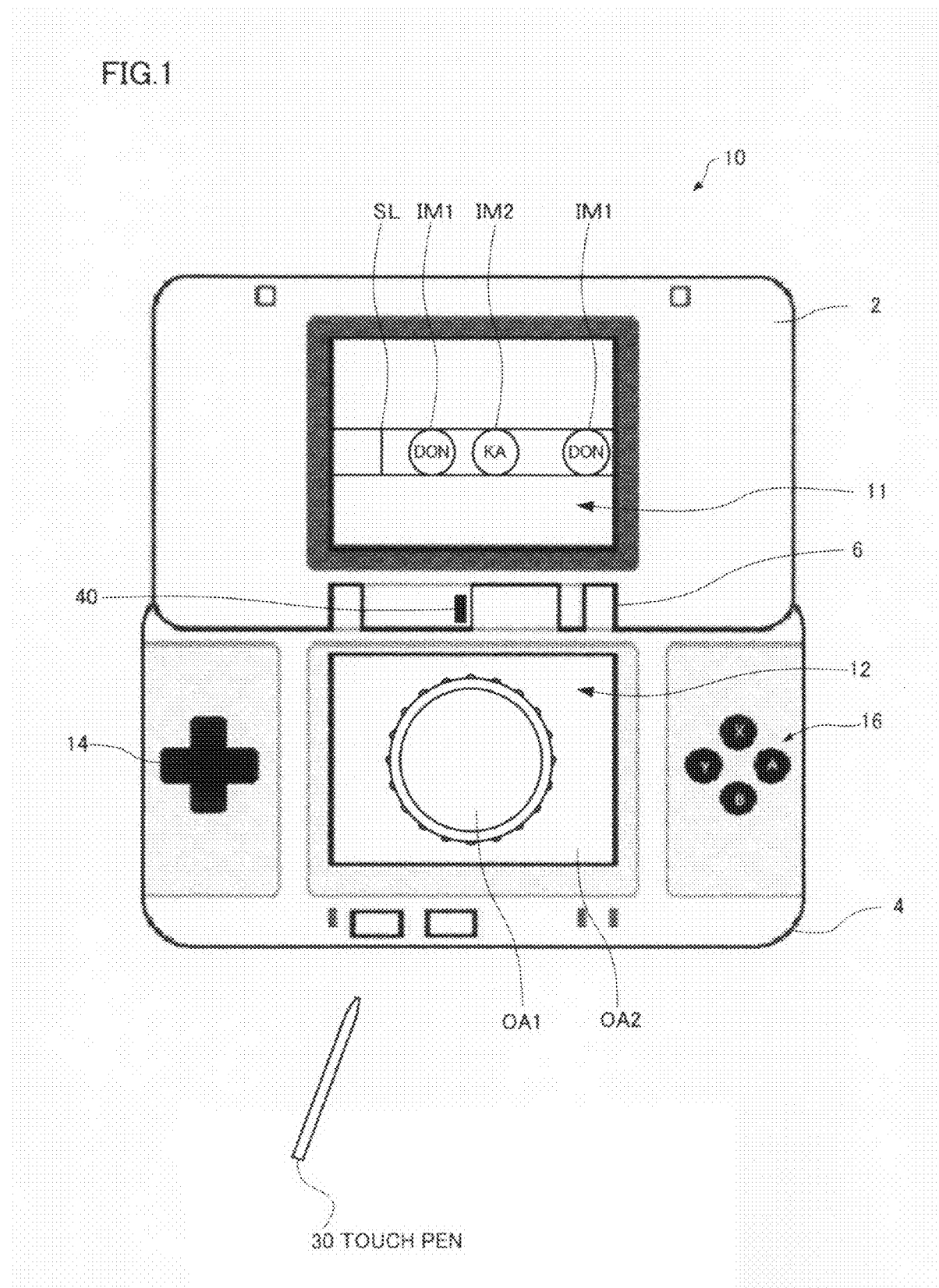
FIG. 1 is an outside view schematically showing an example of a system according to one embodiment of the invention.

The invention may provide a game system which can generate various operation disturbance events by not accepting a predetermined operation for a disturbance area, a program, an information storage medium, and a method of controlling a game system.

(1) According to one embodiment of the invention, there is provided a game system comprising:

a display control section which performs a first display control process which displays an image for proceeding with a game in a first display area, and a second display control process which displays an image that indicates an operation area for which a player should perform a position designation operation in a second display area;

an input processing section which accepts the position designation operation performed for the operation area as a first input operation;

a game calculation section which performs game calculations based on the first input operation which has been accepted by the input processing section; and a disturbance area setting section which sets a disturbance area in the operation area when a given disturbance condition has been satisfied, wherein the input processing section does not accept the position designation operation performed for the disturbance area as the first input operation.

Another embodiment of the invention relates to a program which causes a computer to function as the above-described sections. A further embodiment of the invention relates to a computer-readable information storage medium storing (recording) a program which causes a computer to function as the above-described sections.

The term "position designation operation" according to the invention may be a contact operation for a touch panel display of which the display area formed an operation area which detects the contact operation, an indication operation using a pointing device which allows an indication position in a display area to be detected, a movement operation using a mouse, a trackball, or the like which can designate an arbitrary position in a display area by detecting the moving direction, the moving amount, the moving velocity, and the like of the operation device, or the like. The expression "is not accepted as the first input operation" includes a case where the operation is not accepted as the input operation so that a signal corresponding to the input operation is not output, and a case where the operation is not accepted as an input operation other than the first input operation so that a signal differing from that corresponding to the first input operation is output.

According to the above embodiments, the degree of difficulty and the playability of the game can be variously changed corresponding to the arrangement of the disturbance areas by setting the disturbance areas for which the position designation operation is not accepted as the first input operation in the operation area.

(2) In each of the game system, the program and the information storage medium, the display control section may display an image which represents the disturbance area in the operation area.

This makes it possible for the player to know the disturbance area by displaying the disturbance area set in the operation area as an image.

(3) In each of the game system, the program and the information storage medium, the disturbance area setting section may cancel the disturbance area when a given cancellation condition has been satisfied.

According to the above embodiment, game playability can be improved by setting the disturbance area in the operation area and canceling the set disturbance area.

(4) In each of the game system, the program and the information storage medium, the input processing section may accept the position designation operation performed for the disturbance area as a second input operation; and the disturbance area setting section may cancel the disturbance area based on the accepted second input operation.

According to the above embodiment, since the player performs the position designation operation for the disturbance area for canceling the disturbance area, the degree of difficulty and the playability of the game can be variously changed corresponding to the combination of the position designation operation performed for the operation area and the position designation operation performed for the disturbance area.

(5) In each of the game system, the program and the information storage medium, the input processing section may accept the position designation operation performed for the disturbance area as a second input operation; and the disturbance area setting section may move the disturbance area based on the accepted second input operation.

According to the above embodiment, since the player performs the position designation operation for the disturbance area for moving the disturbance area, the degree of difficulty and the playability of the game can be variously changed corresponding to the combination of the position designation operation performed for the operation area and the position designation operation performed for the disturbance area.

(6) Each of the game system, the program and the information storage medium may further comprise a counter section which counts the passage of time, wherein the disturbance area setting section cancels the disturbance area when a given period of time has elapsed.

According to the above embodiment, since the disturbance area is canceled with the passage of time, the degree of difficulty and the playability of the game can be changed corresponding to the time until the disturbance area is canceled.

(7) Each of the game system, the program and the information storage medium may further comprise an operation area setting section which moves the operation area when a given disturbance condition has been satisfied.

According to the above embodiment, the degree of difficulty and the playability of the game can be variously changed corresponding to the moving amount, the moving velocity, the arrangement, and the like of the operation area for which the position designation operation is accepted as the first input operation.

(8) Each of the game system, the program and the information storage medium may further comprise a communication control section which exchanges information with an external device, wherein the communication control section transmits a disturbance setting command to another device based on a calculation result of the game calculation section; and wherein the disturbance area setting section sets the disturbance area in the operation area based on the disturbance setting command received from the other device.

According to the above embodiment, the disturbance area can be set as match elements (e.g., attack and defense) when forming a match game by causing the disturbance area to be set in the operation area of another device corresponding to the game calculation results and setting the disturbance area in the operation area corresponding to the game calculation results of another device.

(9) Each of the game system, the program and the information storage medium may further comprise an event control section which controls generation of a disturbance event by which whether or not the disturbance condition has been satisfied is determined, wherein the event control section prohibits generation of the disturbance event when the disturbance setting command has been transmitted to the other device.

According to the above embodiment, when the disturbance setting command which causes the disturbance area to be set in the operation area of another device has been transmitted, generation of the disturbance event is prohibited. Therefore, the disturbance area is not set when the disturbance area is set in another device.

(10) Each of the game system, the program and the information storage medium may further comprise:

an event control section which controls generation of a disturbance event by which whether or not the disturbance condition has been satisfied is determined, wherein the communication control section transmits disturbance setting information to the other device when the disturbance area setting section has set the disturbance area; and wherein the event control section prohibits generation of the disturbance event when the disturbance setting information from the other device has been received.

According to the above embodiment, when receiving the disturbance setting information which indicates that the disturbance area has been set in the operation area of another device, generation of the disturbance event is prohibited. Therefore, the disturbance area is not set when the disturbance area is set in another device.

(11) In each of the game system, the program and the information storage medium, the communication control section may transmit disturbance cancellation information to the other device when the disturbance area setting section has canceled the disturbance area; and the event control section may cancel prohibition of generation of the disturbance event when the disturbance cancellation information from the other device has been received.

According to the above embodiment, when receiving the disturbance cancellation information which indicates that the disturbance area set in the operation area of another device has been canceled, prohibition of generation of the disturbance event is canceled. Therefore, the disturbance area can be set when the disturbance area is not set in another device.

(12) Each of the game system, the program and the information storage medium may further comprise:

a music reproduction section which reproduces music data;

a storage section which stores the music data and reference timing data which indicates a reference timing corresponding to music for which the position designation operation should be performed for the operation area; and an operation data acquisition section which acquires operation timing data which indicates an operation timing when the position designation operation has been accepted as the first input operation, wherein the display control section displays an image which allows the player to know the reference timing corresponding to the music in the first display area as the first display control process; and wherein the game calculation section compares the reference timing data with the operation timing data.

According to the above embodiment, when executing a music game in which the player performs the position designation operation for the operation area at the reference timing corresponding to the music, the degree of difficulty and the playability of the game can be variously changed corresponding to the arrangement of the disturbance areas by setting the disturbance area for which the position designation operation is not accepted as the first input operation in the operation area. According to the above embodiment, it is possible to hinder the operation of a player who determines the reference timing based on the music, whereby a game system with higher game playability can be implemented.

(13) In each of the game system, the program and the information storage medium, the music reproduction section may change a reproduction state of the music according to the disturbance area set in the operation area.

According to the above embodiment, the degree of difficulty and the playability of the game can be variously changed by making it difficult for the player to determine the reference timing from the reproduction state of the music by changing the reproduction state of the music while setting the disturbance area in the operation area.

(14) According to one embodiment of the invention, there is provided a game system comprising:

a display control section which performs a first display control process which displays an image for proceeding with a game in a first display area, and a second display control process which displays an image that indicates an operation area for which a player should perform a position designation operation in a second display area;

an input processing section which accepts the position designation operation performed for the operation area as a first input operation;

a game calculation section which performs game calculations based on the first input operation which has been accepted by the input processing section; and an operation area setting section which moves the operation area when a given disturbance condition has been satisfied.

Another embodiment of the invention relates to a program causing a computer to function as the above-described sections. A further embodiment of the invention relates to a computer-readable information storage medium storing (recording) a program which causes a computer to function as the above-described sections.

According to the above embodiments, the degree of difficulty and the playability of the game can be variously changed corresponding to the moving amount, the moving velocity, the arrangement, and the like of the operation area for which the position designation operation is accepted as the first input operation.

(15) In each of the game system, the program and the information storage medium, the disturbance area setting section may set a plurality of disturbance areas which differ in shape.

According to the above embodiment, since the disturbance areas which differ in shape are set, the degree of difficulty and the playability of the game can be variously changed corresponding to the shape of the disturbance area.

Some embodiments of the invention will be described below. Note that the embodiments described below do not in any way limit the scope of the invention laid out in the claims herein. In addition, not all of the elements of the embodiments described below should be taken as essential requirements of the invention.

1. Outline

FIG. 1 is an outside view showing a music game system according to one embodiment of the invention. In the example shown in FIG. 1, the music game system according to this embodiment is formed using a portable game system 10. As shown in FIG. 1, the portable game system 10 according to this embodiment has a configuration in which a main body upper portion 2 and a main body lower portion 4 are connected through a hinge portion 6 so that the main body upper portion 2 and the main body lower portion 4 can be rotated around the hinge axis. The main body upper portion 2 includes a first display 11, and the main body lower portion 4 includes a second display 12. A sound input device 40 (microphone) for the player to input sound (voice input) is provided around the center of the intermediate portion between the main body upper portion 2 and the main body lower portion 4. The main body lower portion 4 includes an operation section such as an arrow key 14 and operation buttons 16. A speaker (not shown) which outputs music or the like used in the music game is provided on the back side of the portable game system 10.

In this embodiment, the second display 12 is a touch panel display formed by stacking a liquid crystal display which displays an image and a touch panel which detects a contact position so that the contact position of the player with respect to the display area of the second display 12 can be detected. In this embodiment, the player holds a touch pen 30 and performs a position designation operation by designating an arbitrary position in the display area of the second display 12 with the tip of the touch pen 30, and the operation position is detected.

In this embodiment, a plurality of instruction marks IM which move to the music in the display area in the leftward direction are displayed on the first display 11. An operation area OA for which the player performs the position designation operation is displayed on the second display 12. The instruction mark IM is displayed on the first display 11 to provide the player with a reference timing for performing the position designation operation using the operation area OA displayed on the second display 12. In this embodiment, a reference line SL is displayed at the left center of the first display 11. The instruction mark IM is moved along a given moving path so that the instruction mark IM is located at the position (evaluation position) of the reference line SL at a reference timing corresponding to each instruction mark IM based on music data.

In this embodiment, a first instruction mark IM1 provided with characters "don (bang)" and a second instruction mark IM2 provided with characters "ka (tap)" are displayed as the instruction marks IM. A first operation area OA1 and a second operation area OA2 are displayed in the operation area OA. The first operation area OA1 is an area for which the player performs the position designation operation when the first instruction mark IM1 is positioned on (has reached) the reference line SL and has a circular shape representing a membrane of a Japanese drum. The second operation area OA2 is an area other than the first operation area OA1 for which the player performs the position designation operation when the second instruction mark IM2 is positioned on (has reached) the reference line SL.

When the player has performed the position designation operation for the first operation area OA1 or the second operation area OA2 corresponding to the instruction mark IM at the reference timing when the first instruction mark IM1 or the second instruction mark IM2 has reached the reference line SL, effect sound corresponding to the instruction mark IM is output from the speaker, and the player makes a score. On the other hand, when the player has failed to perform the position designation operation for the first operation area OA1 or the second operation area OA2 at the reference timing, an unpleasant sound is output from the speaker.

In this embodiment, the player determines the reference timing while observing the movement of the first instruction mark IM1 and the second instruction mark IM2, and enjoys the game by performing the position designation operation for the operation area OA corresponding to the instruction mark IM at the reference timing.

2. Method According to this Embodiment 2-1. Instruction Mark Moving Display Method and Operation Timing Determination Method An instruction mark moving display method and an operation timing determination method according to this embodiment are described below with reference to FIGS. 2A to 2C and FIG. 3. In this embodiment, a plurality of first instruction marks IM1-1 to IM1-n (n is a natural number) and a plurality of second instruction marks IM2-1 to IM2-n are moved in a display area DA in the leftward direction along a given path at a constant speed in synchronization with reproduction of music. In this embodiment, a reference timing KT when the position designation operation should be performed corresponding to the instruction mark IM is provided in advance corresponding to each piece of music. For example, the instruction mark IM is displayed so that the first instruction mark IM1 reaches the reference line SL when a reference timing KT1 corresponding to the first instruction mark IM1-1 has been reached.

Figure 2A:
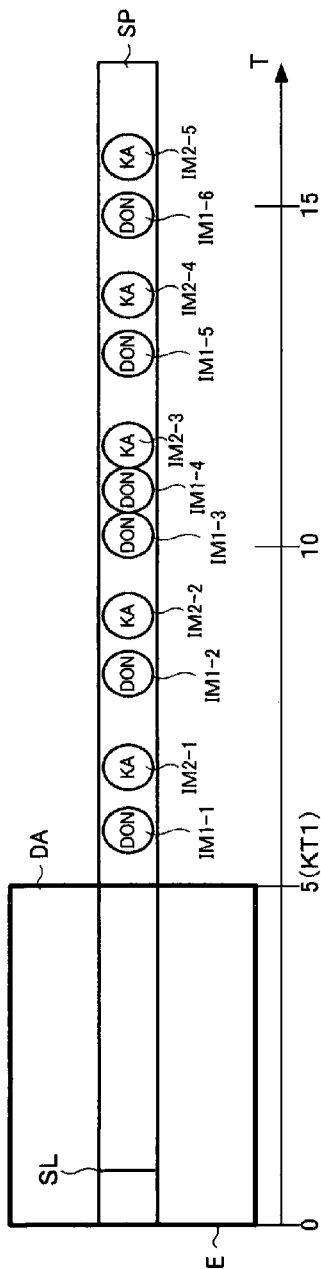
FIGS. 2A to 2C are diagrams illustrative of a method according to one embodiment of the invention.
Figure 2B:
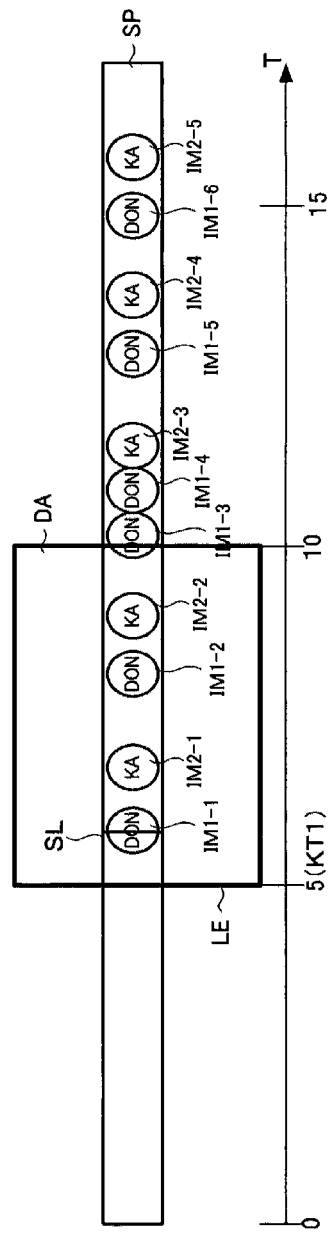
Figure 2C:
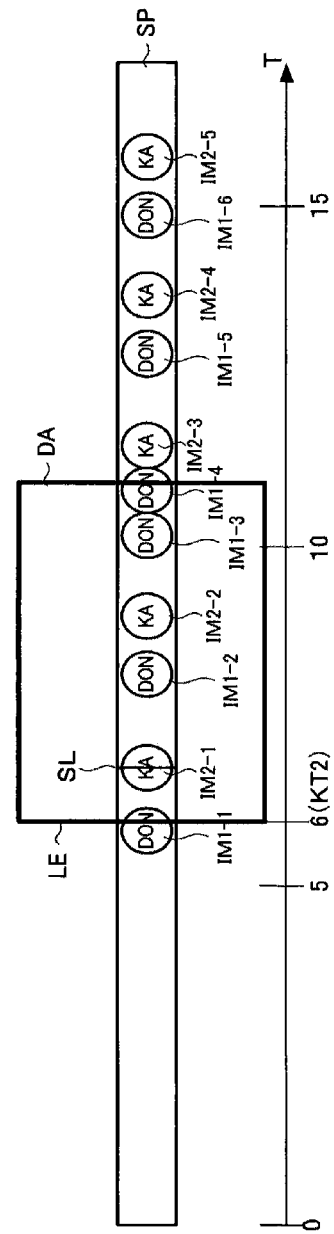

FIGS. 2A to 2C are diagrams illustrative of the relationship between a time T (reproduction of music starts at time 0) and the display position of each instruction mark IM in the display area DA on the second display 12 of the portable game system 10 according to this embodiment. In this embodiment, as shown in FIGS. 2A to 2C, a score image SP is formed in advance which is an oblong image scrolled in the display area DA in synchronization with reproduction of music and in which the first instruction mark IM1 or the second instruction mark IM2 is disposed at a position corresponding to the music. The score image SP is formed by extracting notes corresponding to a characteristic sound of the music from the notes of the actual score of the music, and disposing the first instruction mark IM1 or the second instruction mark IM2 in the score image SP corresponding to the positions of the extracted notes in the score.

In this embodiment, when the music data has not been reproduced (i.e., when zero seconds have elapsed after the music data has been reproduced), the display area DA which indicates the area of the oblong score image SP displayed on the second display 12 is set so that the left end LE of the display area DA coincides with the left end (i.e., 0 seconds) of the score image SP, as shown in FIG. 2A. After the music data has been reproduced, the display area DA moves in the rightward direction with respect to the score image SP parallel to the score image SP with the passage of the time T. An image is thus displayed in which the instruction marks IM move in the display area DA in the leftward direction along a given path, as described with reference to FIG. 1.

In FIG. 2B, the left end LE of the display area DA is positioned at five seconds, for example. Specifically, the score image SP corresponding to the display area DA in FIG. 2B indicates the score image SP displayed in the display area DA when five seconds have elapsed after the music data has been reproduced. In FIG. 2B, the first instruction mark IM1-1 is positioned on the reference line SL in the display area DA. Therefore, the player can determine that the reference timing when the player should perform the position designation operation for the first operation area OA1 occurs when five seconds have elapsed after the music data has been reproduced.

In FIG. 2C, the left end LE of the display area DA is positioned at six seconds. Specifically, the score image SP corresponding to the display area DA in FIG. 2C indicates the score image SP displayed in the display area DA when six seconds have elapsed after the music data has been reproduced. In FIG. 2C, the second instruction mark IM2-1 disposed on the right of the first instruction mark IM1-1 is positioned on the reference line SL in the display area DA. Therefore, the player can determine that the reference timing when the player should perform the position designation operation for the second operation area OA2 occurs when six seconds have elapsed after the music data has been reproduced.

Figure 3A:
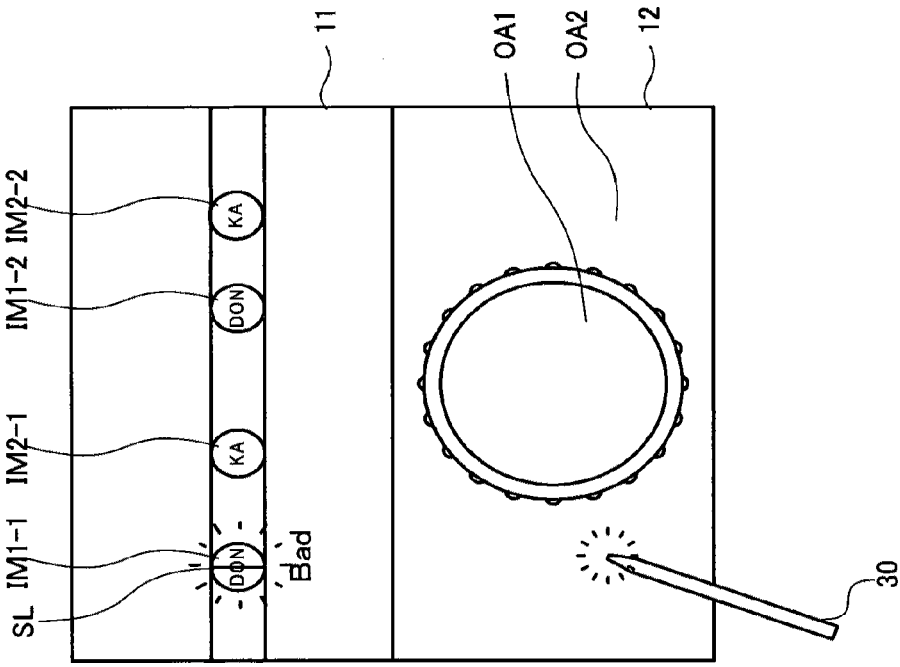
FIGS. 3A and 3B are diagrams showing an example of an image displayed according to one embodiment of the invention.
Figure 3B:
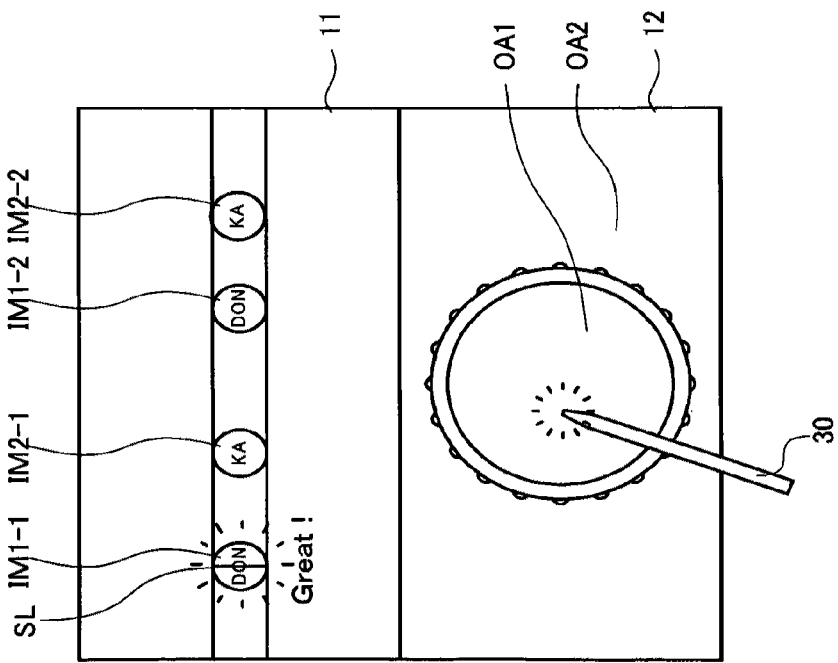

FIGS. 3A and 3B are diagrams illustrative of the relationship between the instruction mark IM displayed on the first display 11 and the position designation operation performed by the player for the operation area OA displayed on the second display 12. In this embodiment, as shown in FIG. 3A, when the reference timing (when five seconds have elapsed after the music data has been reproduced) which is a timing when the center of the first instruction mark IM1-1 has reached the reference line SL coincides with the operation timing when the player has performed the position designation operation for the first operation area OA1 using the tip of the touch pen 30, characters "Great!" are displayed, and the player scores relatively high points.

When the operation timing when the player has performed the position designation operation for the first operation area OA1 is included in a reference period in which the first instruction mark IM1-1 overlaps the reference line SL (within one second around the time when the music has been reproduced for five seconds), even if the operation timing does not precisely coincide with the reference timing, characters "Good" are displayed, and the player scores relatively low points.

As shown in FIG. 3B, when the operation timing when the player has performed the position designation operation for the first operation area OA1 is not included in the reference period in which the first instruction mark IM1-1 overlaps the reference line SL, or when the player has performed the position designation operation for the second operation area OA2, characters "Bad" are displayed, and the player scores no points.

In this embodiment, the instruction marks IM are moved on the first display II along a given moving path so that each instruction mark IM is positioned on the reference line SL (evaluation position) at the reference timing corresponding to each instruction mark IM determined in advance corresponding to the music data. Whether or not the position designation operation has been performed for the operation area OA corresponding to each instruction mark IM at the reference timing corresponding each instruction mark IM is determined, and the position designation operation is evaluated.

2-2. Operation Area Disturbance Control

An operation area disturbance control method according to this embodiment is described below with reference to FIG. 4. In this embodiment, a disturbance area for hindering the position designation operation of the player is set in the operation area OA on the second display 12 when a given disturbance condition has been satisfied in order to improve game playability. In this embodiment, a match game mode can be executed in which at least two portable game systems 10-1 and 10-2 are connected through a communication channel, as shown in FIG. 4, and the players simultaneously play the music game according to this embodiment and compete with each other. When a given event generation condition has been satisfied in the match game mode, a special instruction mark SIM differing from the first instruction mark IM1 and the second instruction mark IM2 is displayed and moved on the first display 11 of one portable game system 101 as the instruction mark IM.

In this embodiment, when the difference in score between the portable game system 10-1 and the portable game system 10-2 has become equal to or larger than a specific value, the special instruction mark SIM is generated on the first display 11 of the portable game system 10-1 of the player with a lower score. Specifically, one of the instruction marks IM for which the reference timing has not been reached is replaced by the special instruction mark SIM.

As shown in FIG. 4, when the player of the portable game system 10-1 has performed the position designation operation for the operation area OA at a timing when the special instruction mark SIM has reached the reference line SL (reference timing corresponding to the special instruction mark SIM), character objects CO are disposed in the operation area OA on the second display 12 of the portable game system 10-2 of the opponent player. The portable game system 10-2 sets the areas in which the character objects CO are disposed to be disturbance areas DA for which the position designation operation is not accepted as a valid input operation (first input operation).

As a result, the operation area OA for which the position designation operation is accepted as a valid input operation (first input operation) is reduced in the portable game system 10-2 of the opponent player with a higher score, as shown in FIG. 4. Therefore, since the player must perform the position designation operation for the operation area OA at the reference timing when the player should perform the position designation operation for the operation area OA while avoiding the disturbance areas DA (character objects CO), the degree of difficulty in the music game can be relatively increased for the portable game system 10-2.

Figure 5A:
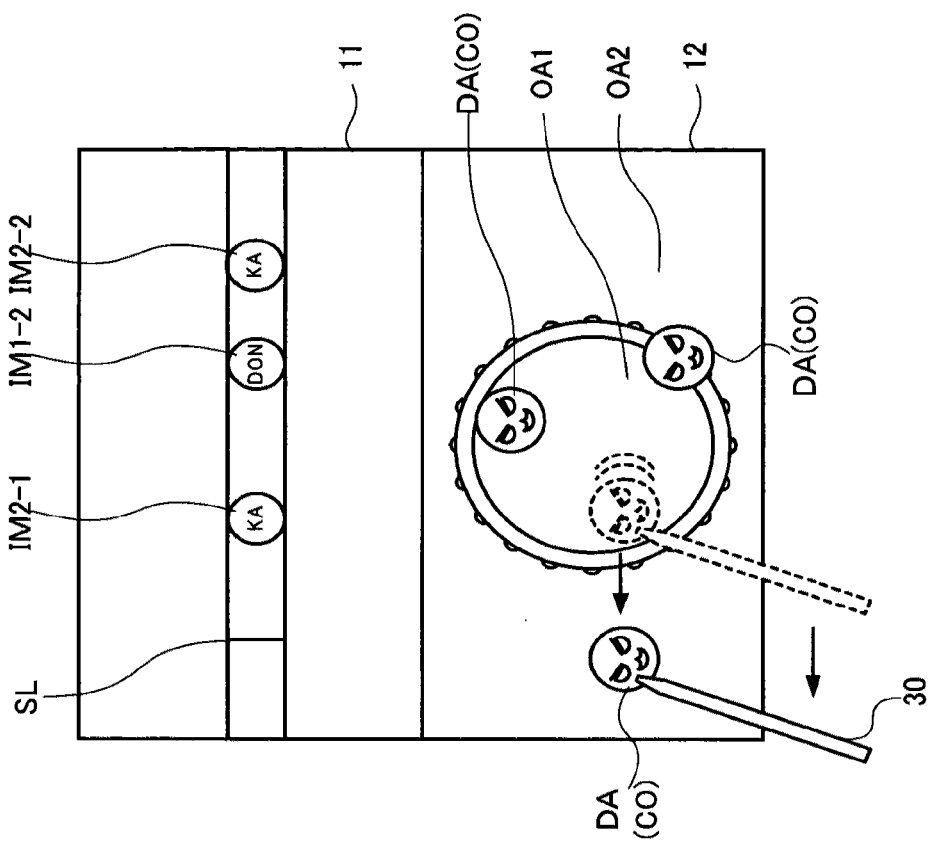
FIGS. 5A and 5B are diagrams showing an example of an image displayed according to one embodiment of the invention.

In this embodiment, the disturbance area DA set as described above is canceled when a given cancellation condition has been satisfied. Specifically, the position designation operation for the disturbance area DA (character object CO) set on the second display 12 is accepted as an operation input (second operation input) for canceling the disturbance area DA. For example, when the player has performed the position designation operation one or more times for the disturbance area DA (character object CO) set in the first operation area OA1, as shown in FIG. 5A, the character object CO is caused to disappear so that the disturbance area DA is canceled.

Figure 5B:
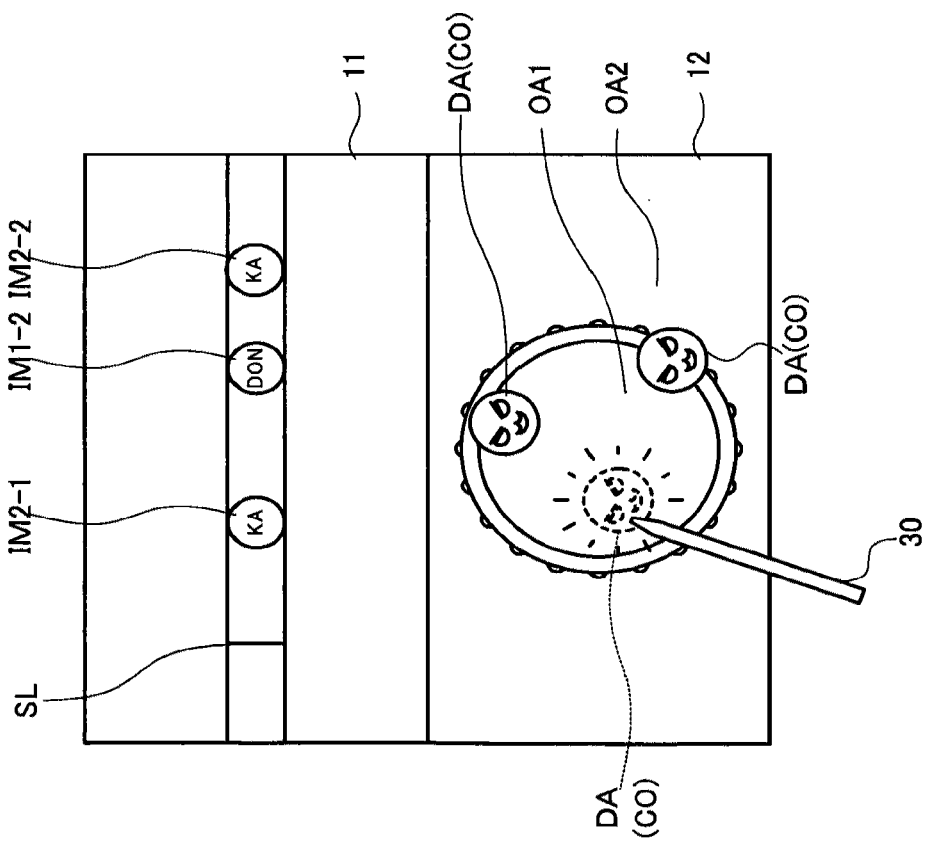

As shown in FIG. 5B, when the player has performed the position designation operation for the disturbance area DA (character object CO) set in the first operation area OA1 and moved the touch pen 30 in a state in which the touch pen 30 contacts the second display 12, the disturbance area DA (character object CO) may be moved to follow the contact position of the touch pen 30.

The player performs the operation input (second operation input) for canceling or moving the disturbance area DA at an interval between the reference timings of the instruction marks IM displayed and moved on the first display 11. The player thus prevents a reduction in the operation area OA, and appropriately performs the position designation operation for the operation area OA corresponding to each instruction mark IM when the reference timing of each instruction mark IM has been reached, while avoiding the remaining disturbance areas DA.

According to this embodiment, the degree of difficulty and the playability of the game can be variously changed corresponding to the arrangement of the disturbance areas DA by setting the disturbance areas DA for which the position designation operation is not accepted as a valid input operation (first input operation) in the operation area OA. According to this embodiment, since the player performs the position designation operation for the disturbance area DA for canceling or moving the disturbance area DA, the degree of difficulty and the playability of the game can be variously changed corresponding to the combination of the position designation operation for the operation area OA and the position designation operation for the disturbance area DA.

3. Configuration

Figure 6:
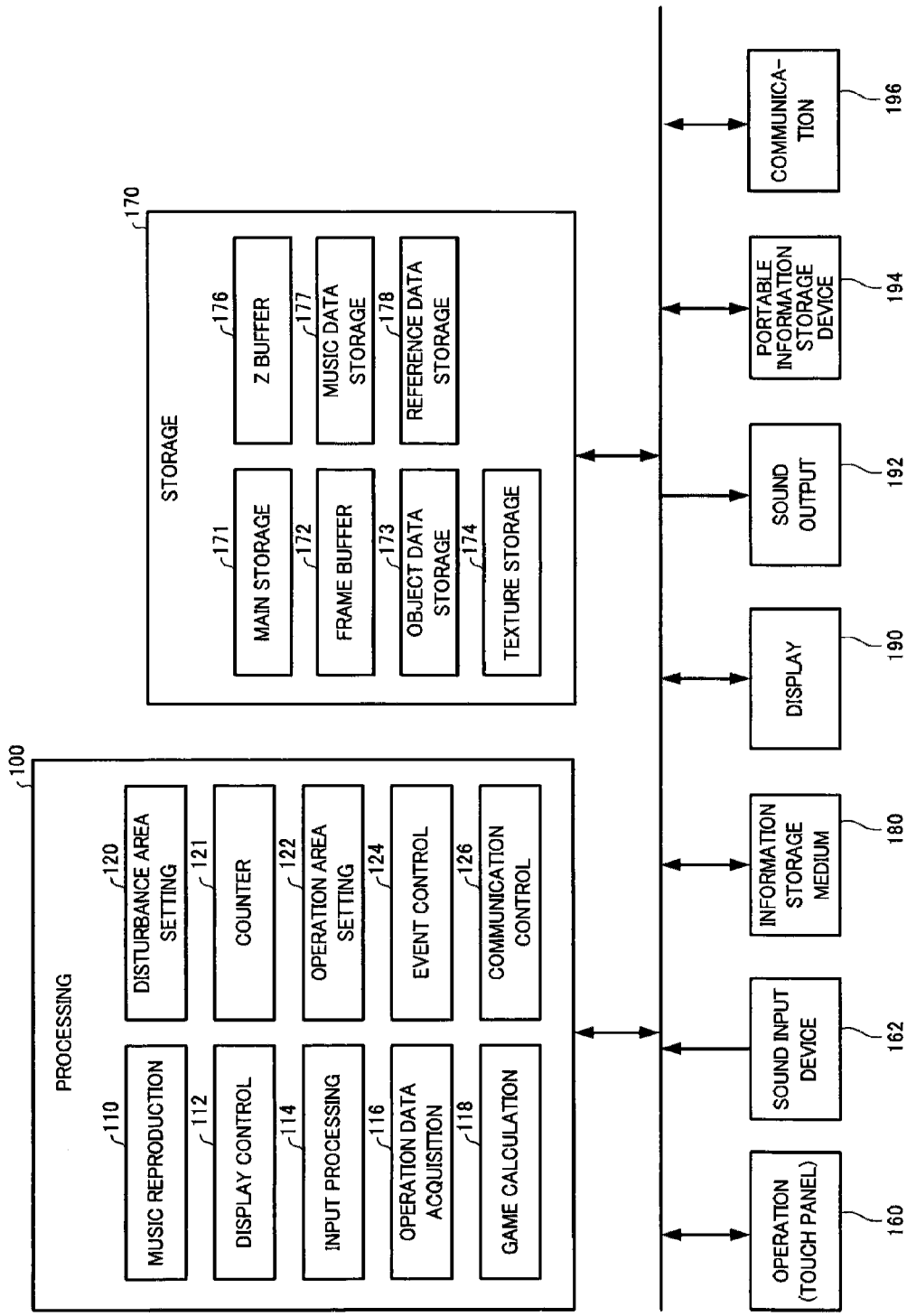
FIG. 6 is a diagram showing an example of functional blocks according to one embodiment of the invention.

The configuration of the game system according to this embodiment is described below with reference to FIG. 6. FIG. 6 shows an example of a functional block diagram of the portable game system 10 according to this embodiment. The portable game system 10 according to this embodiment may have a configuration in which some of the elements (sections) shown in FIG. 6 are omitted.

An operation section 160 allows the player to input operation data. The function of the operation section 160 may be implemented by a lever, a button, a steering wheel, a microphone, a touch panel display, a casing, or the like.

In this embodiment, the second display 12 shown in FIG. 1 has a configuration in which a liquid crystal display and a touch panel for detecting the contact position of the player are stacked. Therefore, the second display 12 according to this embodiment functions as the operation section 160 and as a display section 190. As the touch panel, a touch panel using a resistive film method (four-wire type or five-wire type), an electrostatic capacitive coupling method, an ultrasonic surface acoustic wave method, an infrared scanning method, or the like may be used. The player may perform the contact operation for the second display 12 using an input device such as the touch pen 30 shown in FIG. 1, or with the tip of the finger.

The operation section 160 may be implemented by a pointing device which can detect the indication position in the display area of the display section 190, or may be implemented by a mouse, a trackball, or the like which can designate an arbitrary position in the display area of the display section 190 by detecting the moving direction, the moving amount, the moving velocity, and the like of the operation device. Specifically, the operation section 160 according to this embodiment may be implemented by various devices which allow the player to perform the position designation operation which designates a position in the display area.

A sound input device 162 allows the player to input sound such as voice or a clap. The function of the sound input device 162 may be implemented by a microphone or the like. The player may perform the position designation operation by inputting voice to the sound input device 162.

A storage section 170 serves as a work area for a processing section 100, a communication section 196, and the like. The function of the storage section 170 may be implemented by a RAM (VRAM) or the like. The storage section 170 according to this embodiment includes a main storage section 171 used as a work area, a frame buffer 172 which stores the final display image and the like, an object data storage section 173 which stores model data relating to an object, a texture storage section 174 which stores the texture corresponding to each piece of object data, and a Z buffer 176 which stores a Z value when an image of an object is generated. Note that the storage section 170 may have a configuration in which some of these sections are omitted.

The storage section 170 according to this embodiment further includes a music data storage section 177 which stores music data relating to a plurality of pieces of music, and a reference data storage section 178 which stores reference period data which indicates the reference period including the reference timing when the player should perform the position designation operation and operation area data which indicates the operation area OA for which the player should perform the position designation operation in the reference period. In this embodiment, the reference data storage section 178 stores the reference period data and the operation area data in a correspondence table data format. Specifically, the operation area data relating to the first operation area OA1 is associated with the reference period data relating to the first instruction mark IM1, and the operation area data relating to the second operation area OA2 is associated with the reference period data relating to the second instruction mark IM2. As the table data stored in the reference data storage section 178, different pieces of table data are respectively associated with a plurality of pieces of music data. Specifically, the table data relating to the reference data is provided corresponding to each piece of music data.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like.

A program (data) which causes the processing section 100 to execute various processes according to this embodiment is stored in the information storage medium 180. Specifically, a program which causes a computer to function as each section according to this embodiment (program which causes a computer to perform the process of each section) is stored in the information storage medium 180.

The display section 190 outputs an image generated according to this embodiment. The function of the display section 190 may be implemented by a CRT, an LCD, a touch panel display, a head mount display (HMD), or the like. In this embodiment, the display section 190 includes the first display 11 and the second display 12. The second display 12 also functions as the operation section 160 for the player to perform the game operation using a touch panel display.

When the display section 190 includes two displays, at least the second display 12 may be configured as a touch panel display. A first display area and a second display area may be provided on one display, and at least the second display area may function as a detection area for detecting the contact operation position.

A sound output section 192 outputs sound generated according to this embodiment. The function of the sound output section 192 may be implemented by a speaker, a headphone, or the like. In this embodiment, the sound output section 192 outputs music when the game has been started and the music data has been reproduced.

A portable information storage device 194 stores a player's personal data, game save data, and the like. The portable information storage device 194 may be a memory card, a portable game system, or the like.

The communication section 196 performs various types of control for communicating with the outside (e.g., a host device or an image generation system). The function of the communication section 196 may be implemented by hardware such as a processor or a communication ASIC, a program, or the like.

The program (data) which causes a computer to function as each section according to this embodiment may be distributed to the information storage medium 180 (storage section 170) from an information storage medium included in a host device (server) through a network and the communication section 196. Use of the information storage medium of the host device (server) is also included within the scope of the invention.

The processing section 100 (processor) performs a game process, an image generation process, a sound generation process, and the like based on operation data from the operation section 160, a program, and the like. The game process includes starting the game when game start conditions have been satisfied, proceeding with the game, disposing an object such as a character or a map, displaying an object, calculating game results, finishing the game when game end conditions have been satisfied, and the like. The processing section 100 performs various processes using the storage section 170 as a work area. The function of the processing section 100 may be implemented by hardware such as a processor (e.g. CPU or DSP) or an ASIC (e.g. gate array) and a program.

The processing section 100 according to this embodiment includes a music reproduction section 110, a display control section 112, an input processing section 114, an operation data acquisition section 116, a game calculation section 118, a disturbance area setting section 120, an operation area setting section 122, an event control section 124, and a communication control section 126. Note that the processing section 100 may have a configuration in which some of these sections are omitted.

The music reproduction section 110 reproduces the music data stored in the music data storage section 177, and causes the music to be output from the sound output section 192. The music reproduction section 110 may change the reproduction state of the music corresponding to the disturbance area DA set in the operation area OA. For example, the music reproduction section 110 may reduce the volume of the music, intermittently mute the music, or change an interval or a rhythm corresponding to the number or the area of disturbance areas DA set in the operation area OA so that the player cannot easily determine the reference timing from the reproduction state of the music.

The display control section 112 performs a display control process on an object displayed on the display section 190. Specifically, the display control section 112 performs the display control process such as generating an object (e.g., character, background, target, car, ball, item, building, tree, pillar, wall, or map), designating the display position of an object, or causing an object to disappear. Specifically, the display control section 112 performs the display control process such as registering an object which has been generated in an object list, transferring the object list to a drawing section and the like, or deleting an object which has disappeared from the object list. The display control section 112 performs a first display control process which displays an image for proceeding with the game on the first display 11 (first display area), and a second display control process which displays an image which indicates the operation area for which the player should perform the position designation operation on the second display 12 (second display area).

When executing the above-described music game, the display control section 112 causes an image for the player to determine the reference timing corresponding to the music to be displayed on the first display 11 (first display area) as the first display control process. Specifically, the display control section 112 performs a moving display control process which moves each instruction mark IM along a given moving path so that each instruction mark IM is positioned on the reference line SL at the reference timing corresponding to each instruction mark IM determined in advance corresponding to the music data. For example, the display control section 112 scrolls a score image in which a plurality of first instruction marks IM1 and a plurality of second instruction marks IM2 are disposed at arbitrary positions corresponding to the reproduction state of the music data so that each instruction mark IM is positioned on the reference line SL at the reference timing corresponding to each instruction mark IM. In this embodiment, the display control section 112 horizontally moves an oblong image in which a plurality of instruction marks IM are disposed in the horizontal direction in the display area DA on the first display 11 in the leftward direction.

When executing the above-described music game, the display control section 112 causes the first operation area OA1 which is an area for which the player performs the position designation operation when the first instruction mark IM1 is positioned on (has reached) the reference line SL and has a circular shape representing a membrane of a Japanese drum and the second operation area OA2 which is an area other than the first operation area OA1 for which the player performs the position designation operation when the second instruction mark IM2 is positioned on (has reached) the reference line SL to be displayed as the second display control process.

When the disturbance area DA has been set in the operation area OA on the second display 12, the display control section 112 causes an image of the disturbance area DA to be displayed in the operation area OA. Specifically, the display control section 112 disposes the character object CO at a position where the disturbance area DA is set, or changes the color or the transparency of the area in which the disturbance area DA is set. When the disturbance area DA has been canceled or moved, the display control section 112 causes the character object CO disposed in the disturbance area DA to disappear, or moves the character object CO to follow the movement of the disturbance area DA.

The input processing section 114 accepts the position designation operation performed for the operation area OA as the first input operation, and does not accept the position designation operation performed for the disturbance area DA as the first input operation. The input processing section 114 accepts the position designation operation performed for the disturbance area DA as the second input operation. For example, when executing the above-described music game, the input processing section 114 acquires the operation timing and the operation position of the position designation operation performed for the operation area OA, and compares the operation timing and the operation position with the reference data to evaluate (determine) the position designation operation. The input processing section 114 cancels or moves the disturbance area DA based on the position designation operation performed for the disturbance area DA without evaluating (determining) the position designation operation.

When executing the above-described music game, the operation data acquisition section 116 acquires operation timing data which indicates the operation timing of the position designation operation and operation position data which indicates the operation position of the position designation operation performed at the operation timing based on the position designation operation performed by the player. In this embodiment, the operation data acquisition section 116 acquires the operation timing data when the position designation operation has been detected by the touch panel of the second display 12 and the operation position data at the operation timing. The operation data acquisition section 116 acquires the operation timing data which indicates the operation timing of the position designation operation accepted as the first input operation and the operation position data at the operation timing. Specifically, the operation data acquisition section 116 acquires the operation timing data which indicates the operation timing of the position designation operation performed for the operation area OA and the operation position data at the operation timing.

The game calculation section 118 performs various game calculations for proceeding with the game displayed on the first display 11 based on the first input operation performed (accepted) for the operation area OA on the second display 12. For example, when executing the above-described music game, the game calculation section 118 compares the reference period data with the operation timing data based on the first input operation, and compares the operation area data which indicates the operation area for which the position designation operation should be performed at the operation timing with the operation position data. The game calculation section 118 calculates game results based on the comparison results or produces an image corresponding to the comparison results to evaluate the player. When the comparison results are poor, the game calculation section 118 reduces the volume of or mutes the music data and outputs unpleasant effect sound data.

The disturbance area setting section 120 sets the disturbance area DA in the operation area OA when a given disturbance condition has been satisfied, and cancels the disturbance area DA when a given cancellation condition has been satisfied. Specifically, when executing the above-described music game, when the player has performed the position designation operation for the operation area OA at a timing when the special instruction mark SIM has reached the reference line SL (reference timing of the special instruction mark SIM) in the match game mode, the disturbance area setting section 120 sets the disturbance area DA in the operation area OA on the second display 12 of the portable game system 10 of the opponent player. Specifically, the disturbance area setting section 120 sets the disturbance area DA in the operation area OA of the portable game system 10 based on a disturbance setting command received from another portable game system 10.

When executing a single-player game mode in which a single player plays the game using one portable game system 10, the disturbance area setting section 120 may set the disturbance area DA in the operation area OA on the second display 12 of the portable game system 10 when a given disturbance time or a disturbance time randomly set has been reached, or the score or the number of erroneous operations has satisfied a given condition.

The disturbance area setting section 120 may set a plurality of disturbance areas which differ in shape. For example, the disturbance area setting section 120 may set a disturbance area in the shape of a circle, a rectangle, a star, or a character corresponding to the type of disturbance condition which has been satisfied or the timing when the disturbance condition has been satisfied, or at random.

The disturbance area setting section 120 cancels or moves the disturbance area DA based on the accepted second input operation. Specifically, when the player has performed the position designation operation one or more times for the disturbance area DA (character object CO), the disturbance area setting section 120 causes the character object CO to disappear to cancel the disturbance area DA. When the player has performed the position designation operation for the disturbance area DA (character object CO) and moved the touch pen 30 in a state in which the touch pen 30 contacts the second display 12, the disturbance area setting section 120 may move the disturbance area DA (character object CO) to follow the contact position of the touch pen 30. Specifically, the disturbance area setting section 120 changes coordinate data corresponding to the disturbance area DA based on the second input operation.

The disturbance area setting section 120 may cancel or move the disturbance area DA based on an input operation performed using the arrow key 14, the operation button 16, or the like provided to the main body lower portion 4 of the portable game system 10, or based on an input (sound) to the sound input device 40 (microphone).

A counter section 121 may count the time, and the disturbance area setting section 120 may cancel the disturbance area when a given period of time has elapsed. In this case, the position designation operation performed for the disturbance area may not be accepted until a given period of time elapses. Alternatively, the position designation operation performed for the disturbance area may be accepted as the second input operation, and the score of the player may be decremented or the parameter of the player may be updated to a player's disadvantage based on the accepted second input operation.

The operation area setting section 122 moves the operation area OA when a given disturbance condition has been satisfied. Specifically, the operation area setting section 122 changes coordinate data corresponding to the area for which the position designation operation is accepted as the first input operation. This hinders the position designation operation performed by the player.

The event control section 124 controls generation of a disturbance event by which whether or not a given disturbance condition has been satisfied is determined. Specifically, when executing the above-described music game, when the difference in score between the portable game system 10-1 and the portable game system 10-2 has become equal to or larger than a specific value, the event control section 124 generates the special instruction mark SIM on the first display 11 of the portable game system 10-1 of the player with a lower score. Specifically, the event control section 124 replaces one of the instruction marks IM for which the reference timing has not been reached by the special instruction mark SIM.

When the event control section 124 has transmitted a disturbance setting command which causes another portable game system to set the disturbance area DA, or has received disturbance setting information which indicates that the disturbance area DA has been set from another portable game system, the event control section 124 prohibits generation of the disturbance event in the portable game system. When the event control section 124 has received disturbance cancellation information which indicates that the disturbance area DA has been canceled from another portable game system, the event control section 124 prohibits generation of the disturbance event in the portable game system.

The communication control section 126 exchanges information with an external device. Specifically, the communication control section 126 transmits the disturbance setting command to another portable game system based on the calculation results of the game calculation section 118, transmits the disturbance setting information to another portable game system when the disturbance area setting section 120 has set the disturbance area DA, or transmits disturbance cancellation information to another portable game system when the disturbance area setting section 120 has canceled the disturbance area DA.

Figure 7:
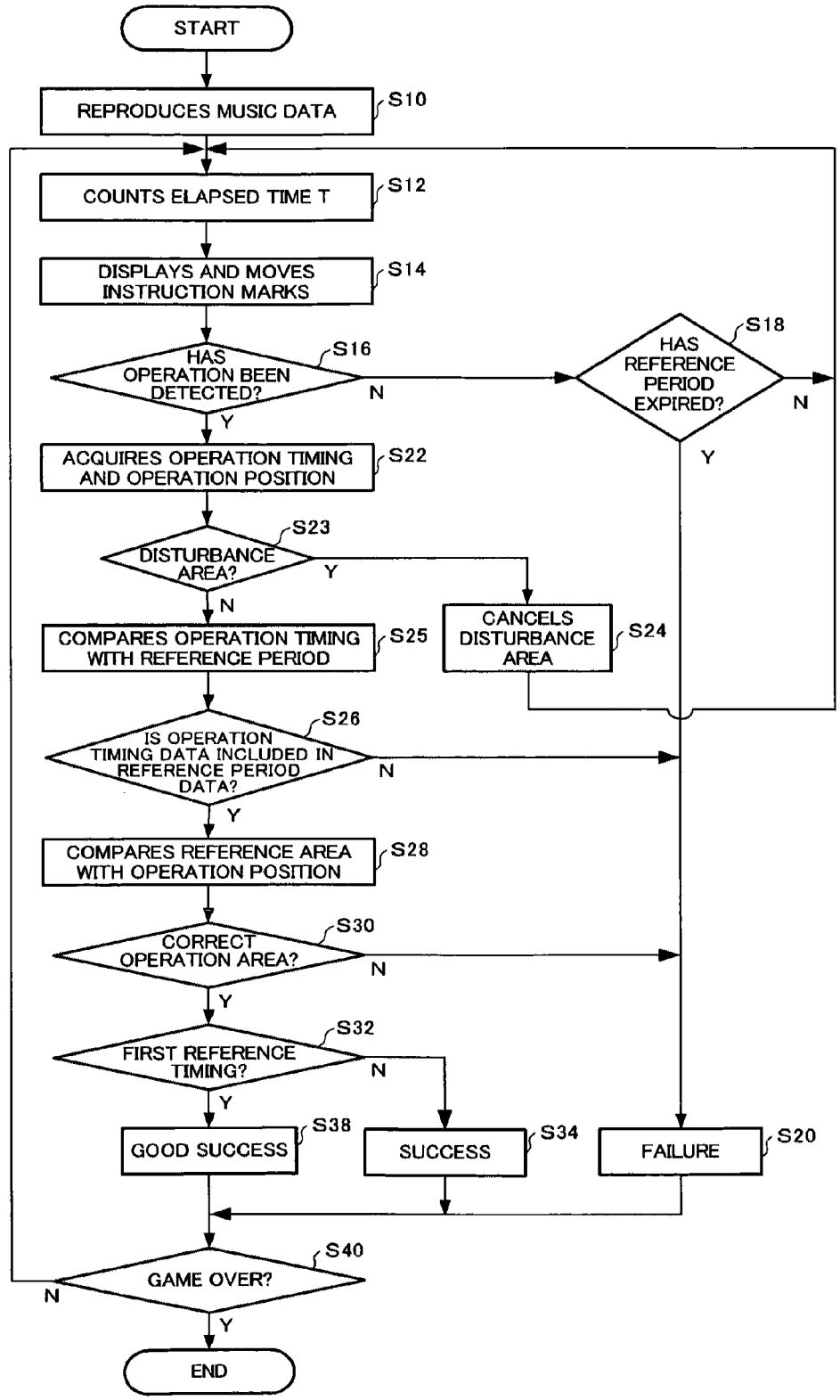
FIG. 7 is a flowchart showing an example of the flow of a process according to one embodiment of the invention.

4. Process According to this Embodiment 4-1. Determination of Position Designation Operation The process according to this embodiment is described below with reference to FIG. 7. FIG. 7 is a flowchart showing an example of a position designation operation determination process performed by the portable game system 10 according to this embodiment. In this embodiment, as shown in FIG. 7, the music data is reproduced when the game starts (step S10). The portable game system 10 counts the elapsed time T from the time (zero) when the music data started to be reproduced (step S12), and displays and moves the first instruction marks IM1 and the second instruction marks IM2 (step S14).

The portable game system 10 monitors a contact operation for the second display 12 (step S16). When the portable game system 10 has not detected a contact operation (N in step S16), the portable game system 10 determines whether or not the reference period set corresponding to the music has expired (step S18). When the portable game system 10 has determined that the reference period has expired (Y in step S18), the portable game system 10 outputs "failure" which indicates that the player has failed to perform the operation (step S20). When the portable game system 10 has determined that the reference period has not expired (N in step S18), the portable game system 10 returns to the step S12, and repeats the process from the step S12 to the step S18. When the portable game system 10 has detected a contact operation (Y in step S16), the portable game system 10 acquires the elapsed time T (count value) when the portable game system 10 has detected the contact operation as the operation timing data, and acquires the coordinate value at which the contact operation has been performed (accepted) for the detection area (display area DA) on the second display 12 as the operation position data (step S22).

When the acquired operation position data is included in the disturbance area DA (i.e., the player has performed the position designation operation for the disturbance area DA) (Y in step S23), the portable game system 10 cancels the disturbance area DA, and causes the character object CO to disappear (step S24). The portable game system 10 then returns to the step S12, and repeats the process from the step S12 to the step S24. Specifically, when the player has performed the position designation operation for the disturbance area DA, the portable game system 10 accepts the position designation operation as the operation input (second operation input) for canceling the disturbance area DA instead of accepting the position designation operation as a valid input operation (first input operation).

When the acquired operation position data is not included in the disturbance area DA (i.e., the player has performed the position designation operation for the operation area OA) (N in step S23), the portable game system 10 refers to the table data relating to the reference period data stored in the reference data storage section 178 based on the operation timing data acquired in the step S22 (step S25), and determines whether or not the operation timing data is included in the reference period data (step S26). Specifically, when the player has performed the position designation operation for the operation area OA, the portable game system 10 accepts the position designation operation as a valid input operation (first input operation), and performs the process in the step S25 and the subsequent steps.

When the operation timing data is not included in the reference period data (N in step S26), the portable game system 10 outputs "failure" which indicates that the player has failed to perform the operation (step S20). When the operation timing data is included in the reference period data (Y in step S26), the portable game system 10 refers to the operation area data corresponding to the reference period data (step S28), and determines whether or not the operation position data is included in the correct operation area data (i.e., whether or not the player has performed the position designation operation for the first operation area OA1 in the reference period corresponding to the first instruction mark IM1, and whether or not the player has performed the position designation operation for the second operation area OA2 in the reference period corresponding to the second instruction mark IM2) (step S30).

When the operation position data is not included in the correct operation area data (N in step S30), the portable game system 10 outputs "failure" which indicates that the player has failed to perform the operation (step S20). When the operation position data is included in the correct operation area data (Y in step S30), the portable game system 10 determines whether or not the operation timing data indicates a timing within a first range close to the reference timing in the reference period data (step S32). When the operation timing data does not indicate a timing within the first range (N in step S32), the portable game system 10 outputs "success" which indicates that the player has successfully performed the operation (step S34). When the operation timing data indicates a timing within the first range (Y in step S32), the portable game system 10 outputs "good success" which indicates that the player has very successfully performed the operation (step S38).

In this embodiment, the process in the steps S12 to S38 is repeated every 1/30th of a second. Specifically, this embodiment employs an image update rate of 1/30th of a second. The elapsed time T is counted, the first marks and the second marks are displayed each time the image is updated (every frame), and the elapsed period and operation data acceptance are monitored.

4-2. Control of Disturbance Event Generation

Figure 8:
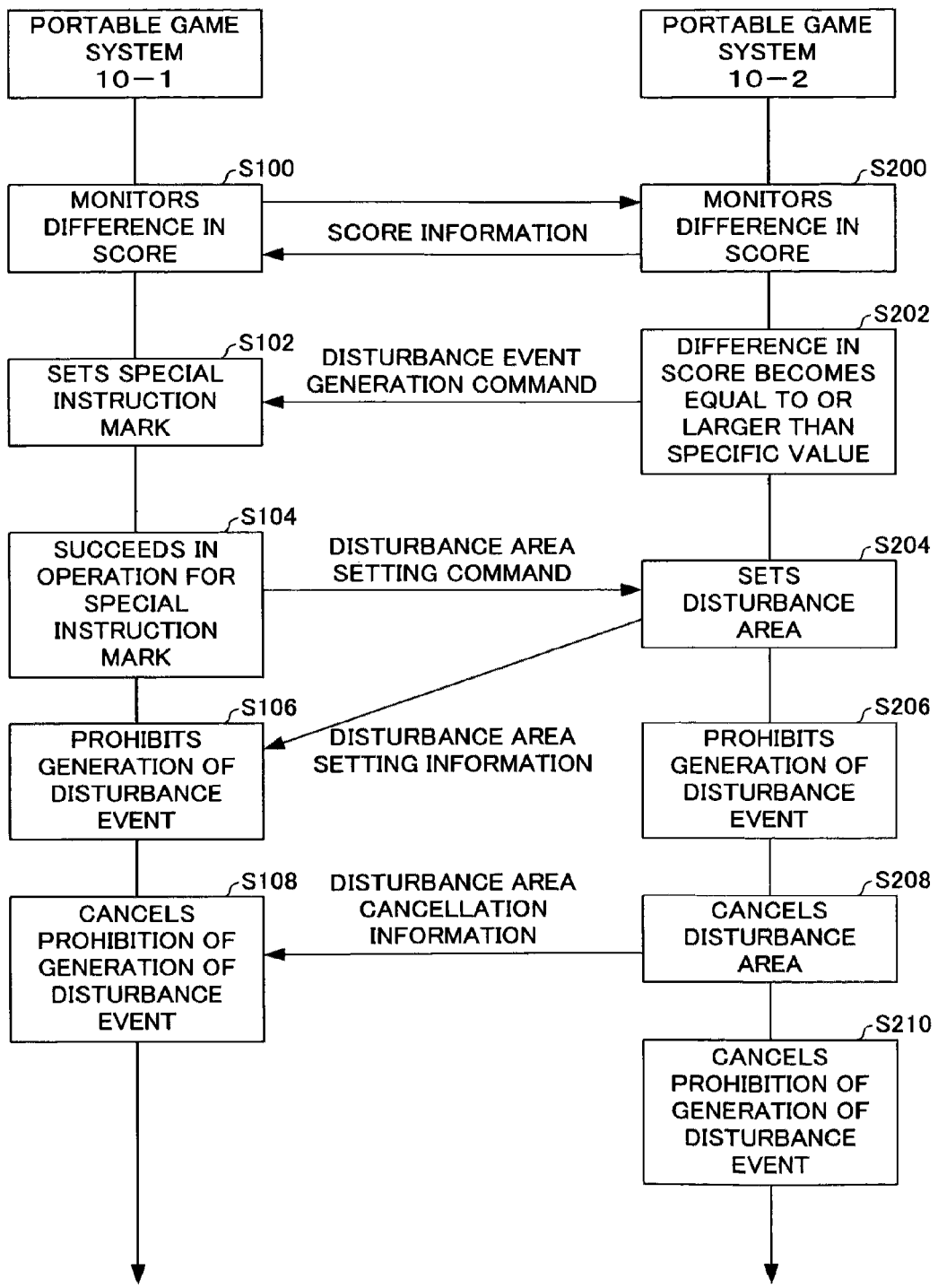
FIG. 8 is an interaction diagram showing an example of the flow of a process according to one embodiment of the invention.

A state transition according to this embodiment is described below with reference to FIG. 8. FIG. 8 is an interaction diagram showing an example of a disturbance event generation control process performed between the portable game system 10-1 and the portable game system 10-2 according to this embodiment. In this embodiment, as shown in FIG. 8, the portable game system 10-1 and the portable game system 10-2 exchange score information to monitor the difference in score between the portable game system 10-1 and the portable game system 10-2 (steps S100 and S200). For example, when the portable game system 10-2 has a higher score and the difference in score between the portable game system 10-1 and the portable game system 10-2 has become equal to or larger than a specific value (step S202), the portable game system 10-2 transmits the disturbance event generation command to the portable game system 10-1. The portable game system 10-1 then generates the special instruction mark SIM on the first display 11 (step S102).

When the player of the portable game system 10-1 has performed the position designation operation for the operation area OA at a timing when the special instruction mark SIM has reached the reference line SL (step S104), the portable game system 10-1 transmits the disturbance area setting command to the portable game system 10-2. The portable game system 10-2 then sets the disturbance area DA in the operation area OA on the second display 12 (step S204), and transmits the disturbance area setting information to the portable game system 10-1. The portable game system 10-1 and the portable game system 10-2 then prohibit generation of the disturbance event (steps S106 and S206).

When the player of the portable game system 10-2 has canceled all disturbance areas DA (step S208), the portable game system 10-2 transmits disturbance area cancellation information to the portable game system 10-1. The portable game system 10-1 and the portable game system 10-2 then cancel prohibition of generation of the disturbance event (steps S108 and S210). The portable game system 10-1 and the portable game system 10-2 again exchange score information to monitor the difference in score between the portable game system 10-1 and the portable game system 10-2 (steps S100 and S200), and repeat the above-described process.

In this embodiment, the disturbance area is not set in the portable game system when the disturbance area is set in another portable game system. When the disturbance area is set in another portable game system, the disturbance area is not set again in the other portable game system. The disturbance area may be set in the portable game system when the disturbance area is set in another portable game system while preventing the disturbance area from being set again in the other portable game system.

5. Hardware Configuration

Figure 9:
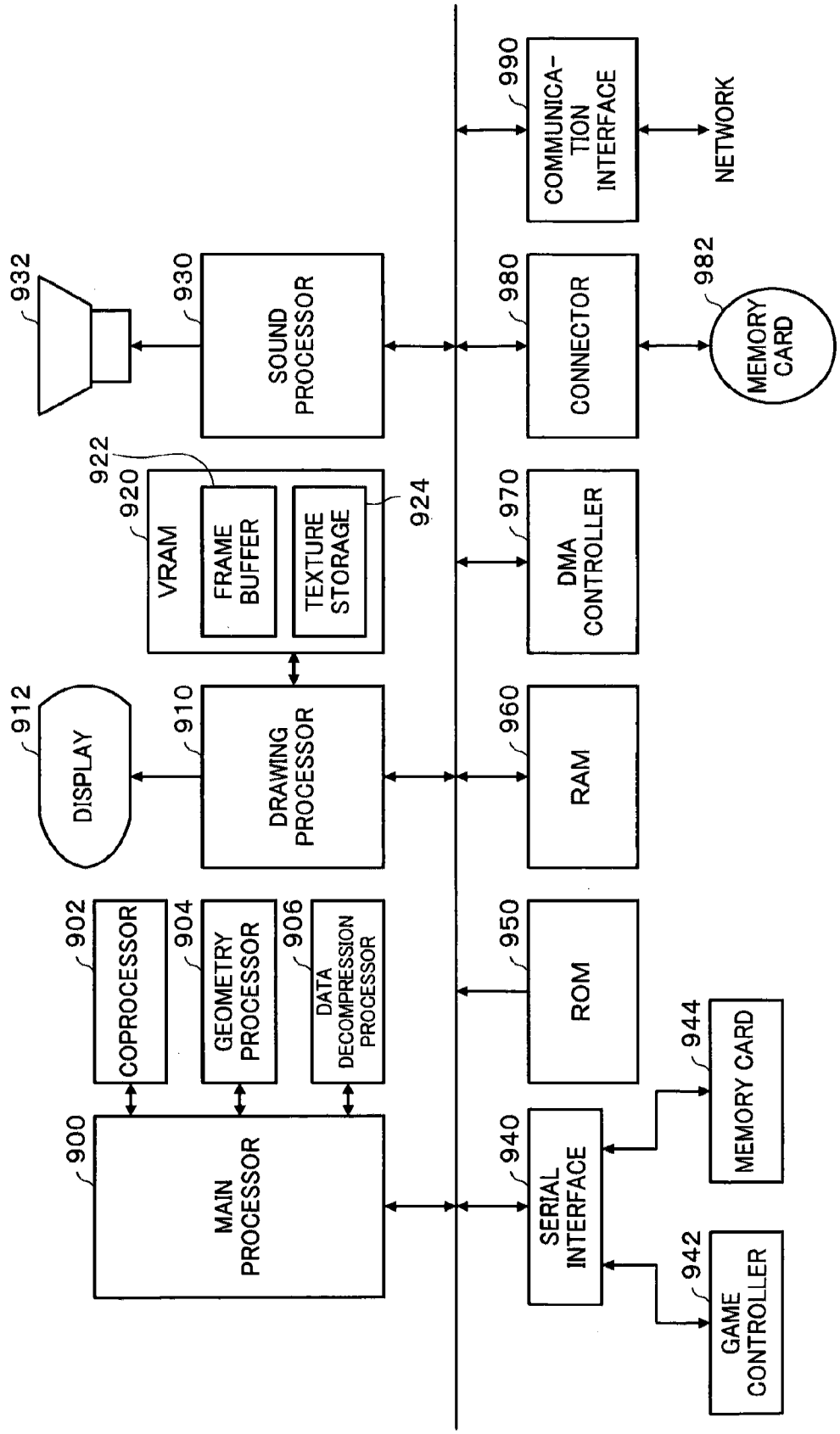
FIG. 9 is a diagram showing an example of a hardware configuration by which one embodiment of the invention can be implemented.

FIG. 9 shows an example of a hardware configuration by which this embodiment can be implemented. A main processor 900 operates based on a program stored in a memory card 982, a program downloaded through a communication interface 990, a program stored in a ROM 950, or the like, and performs a game process, image processing, sound processing, and the like. A coprocessor 902 assists the process of the main processor 900, and performs matrix calculations (vector calculations) at high speed. When matrix calculations are necessary for a physical simulation which causes an object to move or make a motion, a program which operates on the main processor 900 directs (requests) the coprocessor 902 to perform the matrix calculation process.

A geometry processor 904 performs a geometric process such as a coordinate transformation, perspective transformation, light source calculation, or curved surface generation based on instructions from a program operating on the main processor 900, and performs matrix calculations at high speed. A data decompression processor 906 decodes compressed image data or sound data, or accelerates the decoding process of the main processor 900. This enables a video image compressed according to the MPEG standard or the like to be displayed in a start screen or a game screen.

A drawing processor 910 draws (renders) an object formed by a primitive surface such as a polygon or a curved surface. When drawing an object, the main processor 900 delivers drawing data to the drawing processor 910 by utilizing a DMA controller 970, and transfers a texture to a texture storage section 924, if necessary. The drawing processor 910 draws an object in a frame buffer 922 based on the drawing data and the texture while performing hidden surface removal utilizing a Z buffer or the like. The drawing processor 910 also performs alpha blending (translucent processing), depth queuing, MIP mapping, a fog process, bilinear filtering, trilinear filtering, anti-aliasing, a shading process, and the like. When the image of one frame has been written into the frame buffer 922, the image is displayed on a display 912.

A sound processor 930 includes a multi-channel ADPCM sound source or the like, generates game sound such as background music (BGM), effect sound, or voice, and outputs the generated game sound through a speaker 932. Data from a game controller 942 or a memory card 944 is input through a serial interface 940.

A system program or the like is stored in the ROM 950. In the case of an arcade game system, the ROM 950 functions as an information storage medium which stores various programs. A hard disk may be used instead of the ROM 950. A RAM 960 functions as a work area for various processors. The DMA controller 970 controls DMA transfer between the processor and the memory. A connector 980 accesses the memory card 982 which stores a program, image data, sound data, and the like. The communication interface 990 transfers data to and from the outside through a network (communication line or high-speed serial bus).

The process of each section (each means) according to this embodiment may be implemented by only hardware, or may be implemented by a program stored in the information storage medium or a program distributed through the communication interface. Alternatively, the process of each section according to this embodiment may be implemented by hardware and a program.

When implementing the process of each section according to this embodiment by hardware and a program, a program which causes hardware (a computer) to function as each section according to this embodiment is stored in the information storage medium. Specifically, the program instructs the processors 902, 904, 906, 910, and 930 (hardware) to perform the process, and transfers data to the processors 902, 904, 906, 910, and 930, if necessary. The processors 902, 904, 906, 910, and 930 implement the process of each section according to this embodiment based on the instructions and the transferred data.

6. Modification

The invention is not limited to the above-described embodiments. Various modifications and variations may be made. For example, any term cited with a different term having a broader meaning or the same meaning at least once in the specification and the drawings may be replaced by the different term in any place in the specification and the drawings.

As the method of setting the disturbance area DA shown in FIG. 4 and the method of canceling the disturbance area DA shown in FIGS. 5A and 5B, various methods may be employed. For example, as shown in FIG. 10A, a breakage image BO in which a membrane of a Japanese drum corresponding to the first operation area OA1 breaks may be displayed on the second display 12 when the disturbance condition has been satisfied, and the area of the breakage image BO may be set to be the disturbance area DA. When the player has performed the position designation operation (consecutive position designation operations) by reciprocating the tip of the touch pen 30 to rub against the breakage image BO (disturbance area DA) in a state in which the tip of the touch pen 30 contacts the second display 12, the transparency of the breakage image BO may be gradually increased (made thinner) so that the first operation area OA1 gradually appears to cancel the disturbance area DA.

As shown in FIG. 10A, the brightness of the image of the first operation area OA1 and the second operation area OA2 on the second display 12 may be reduced when the disturbance condition has been satisfied (i.e., the luminance may be reduced), and the area of which the brightness has been reduced may be set to be the disturbance area DA. When the player has performed the position designation operation (consecutive position designation operations) by reciprocating the tip of the touch pen 30 to rub against the area of which the brightness has been reduced (disturbance area DA) in a state in which the tip of the touch pen 30 contacts the second display 12, the brightness of the area for which the position designation operation has been performed may be increased (i.e., the luminance may be increased) so that the first operation area OA1 and the second operation area OA2 appear in the area for which the position designation operation has been performed to cancel the disturbance area DA.

Figure 11:
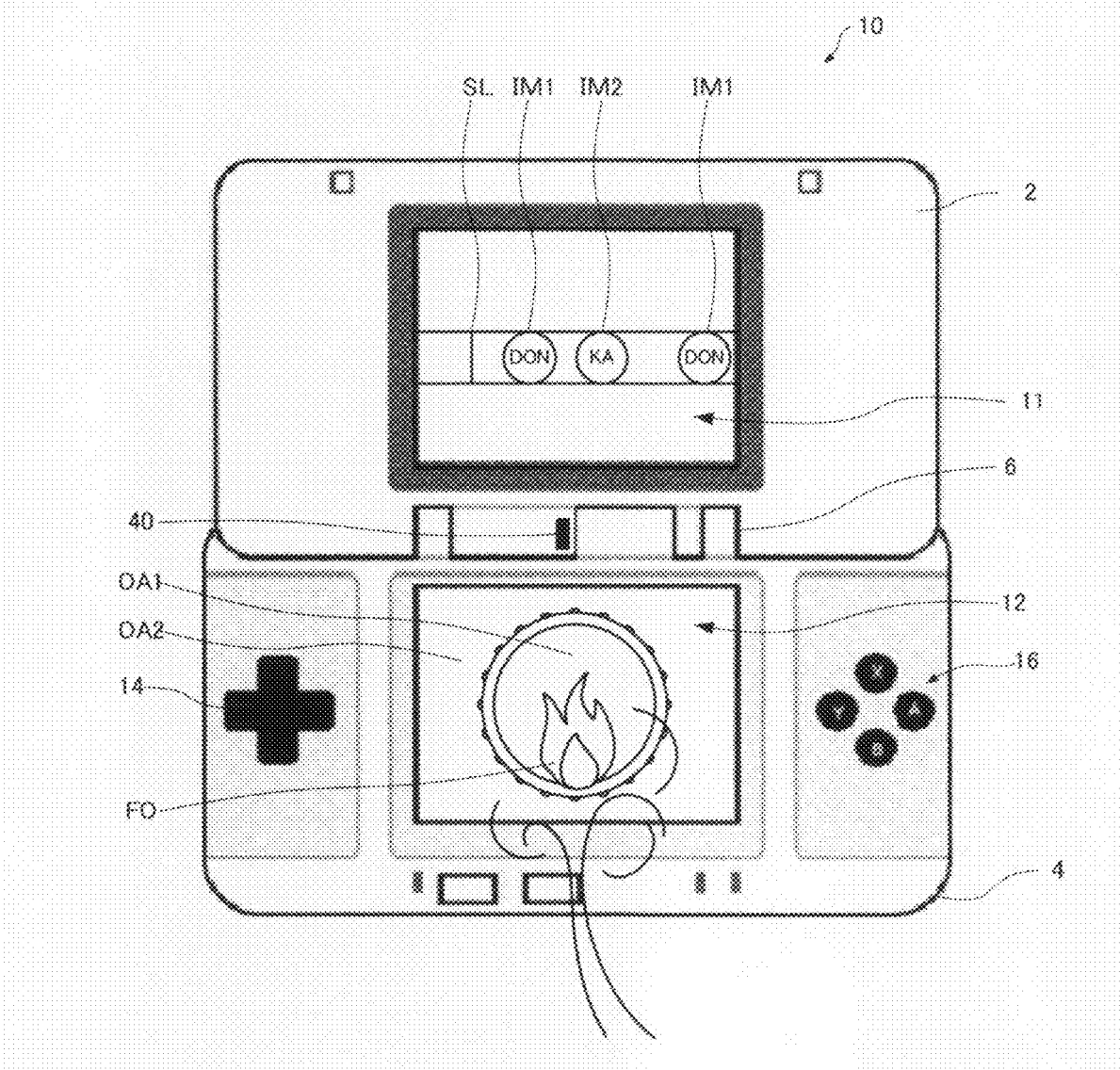
FIG. 11 is a diagram showing another modification of one embodiment of the invention.

As shown in FIG. 11, a flame image FO in which a Japanese drum corresponding to the first operation area OA1 fires may be displayed on the second display 12 when the disturbance condition has been satisfied, and the area of the flame image FO may be set to be the disturbance area DA. The flame image FO may be enlarged with the passage of time so that the disturbance area DA increases. The player may input sound (sound generated by the breath input to a microphone) to the sound input device 40 (microphone) to blow on the flame image FO (disturbance area DA), and the flame image FO may be caused to disappear when the level of the detected sound has exceeded a threshold value to cancel the disturbance area DA.

Figure 12A:
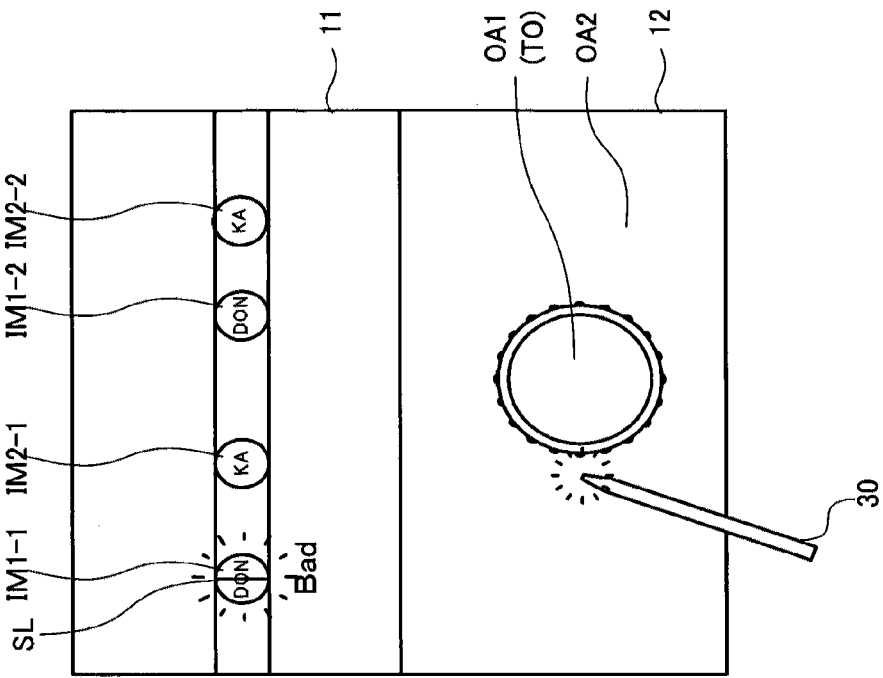
FIGS. 12A and 12B are diagrams showing another modification of one embodiment of the invention.
Figure 12B:
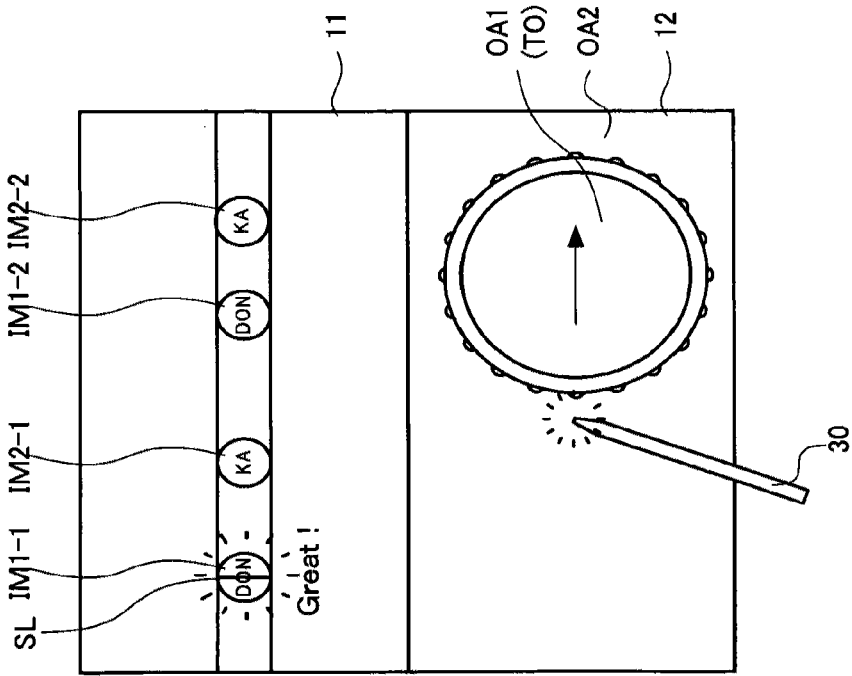

As shown in FIG. 12A, the first operation area OA1 (Japanese drum object TO) on the second display 12 may be moved when the disturbance condition has been satisfied. As shown in FIG. 12B, the size, range, shape or the like of the operation area OA (Japanese drum object TO) may be changed to hinder the position designation operation performed by the player.

The invention may be applied to various games (e.g., racing game, action game, fighting game, and role-playing game) other than the music game in which an image for proceeding with a game is displayed on a first display area (first display 11) (first display control process), an image which indicates an operation area for which the player should perform a position designation operation is displayed on a second display area (second display 12) (second display control process), and the position designation operation performed for the operation area is accepted as a first input operation (first input operation acceptance process).

Figure 13A:
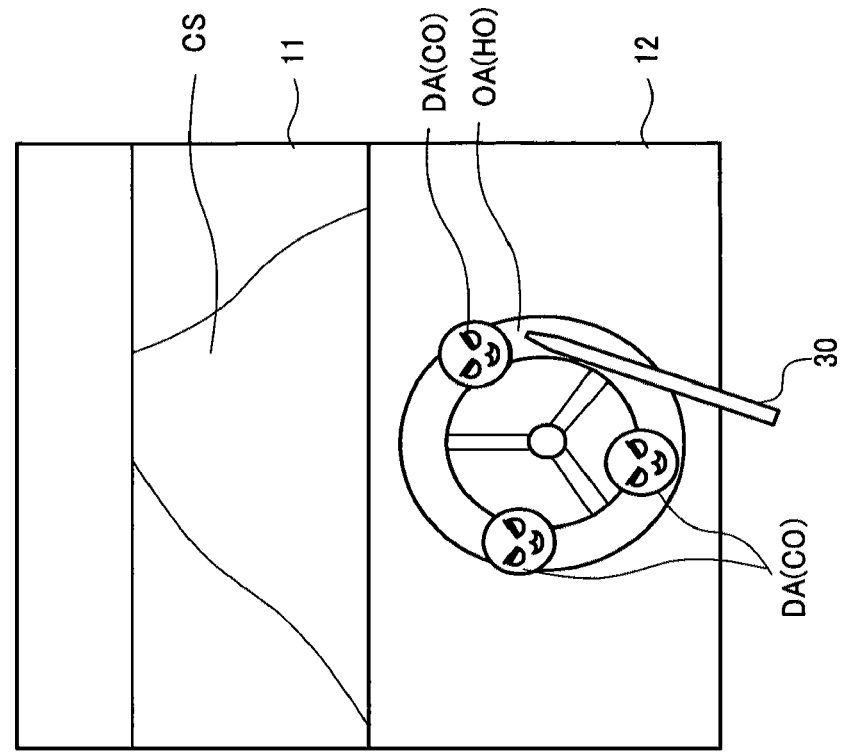
FIGS. 13A and 13B are diagrams showing a further modification of one embodiment of the invention.

For example, when applying the invention to a racing game, as shown in FIG. 13A, a racecourse CS where a moving object should travel is displayed on the first display 11 as the first display control process, and a steering wheel HO for steering the moving object is displayed on the second display 12 as the second display control process. The area of the ring of the steering wheel HO is set to be the operation area OA. A position designation operation (consecutive position designation operations) which moves the tip of the touch pen 30 along the operation area OA in a state in which the tip of the touch pen 30 contacts the operation area OA is accepted as the first input operation acceptance process, and the moving direction and the moving amount of the moving object (viewpoint or virtual camera) are controlled based on the operation direction and the amount of operation accepted. For example, when the tip of the touch pen 30 is moved in the rightward direction along the operation area OA in a state in which the tip of the touch pen 30 contacts the operation area OA, the position designation operation is accepted as an operation input in the rightward direction, and the moving body is moved in the rightward direction.

Figure 13B:
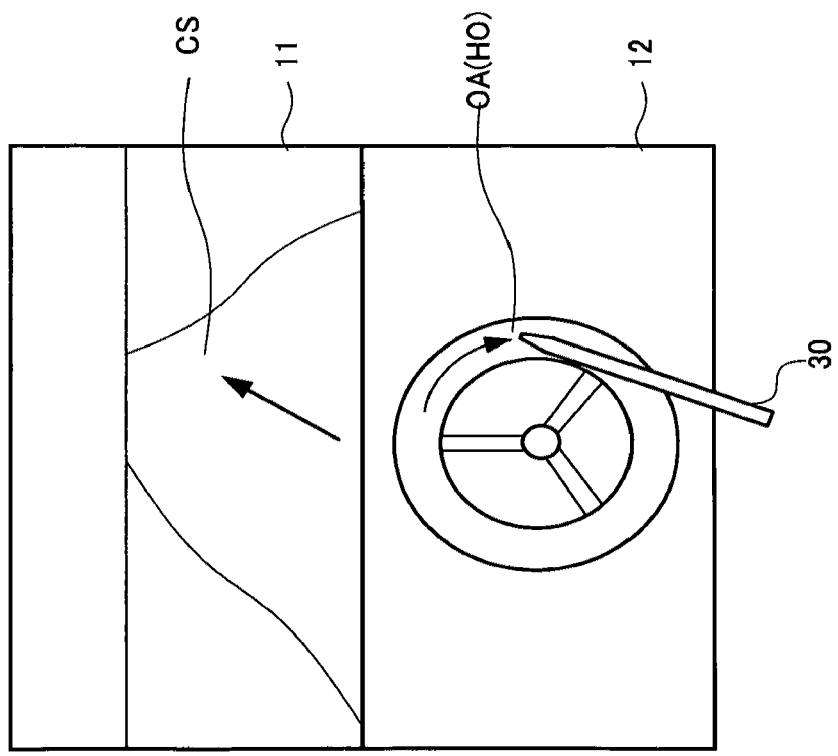

As shown in FIG. 13B, the disturbance area DA is set in the operation area OA when the disturbance condition has been satisfied, and the position designation operation performed for the disturbance area DA is not accepted as the first input operation. Specifically, even if the position designation operation has been performed for the disturbance area DA, the position designation operation is not used as information for controlling the moving direction and the moving amount of the moving body. The position designation operation performed for the disturbance area DA is accepted as the second input operation, and the disturbance area DA is canceled or moved based on the accepted second input operation.

The invention may be applied to various game systems such as an arcade game system, a consumer game system, a large-scale attraction system in which a number of players participate, a simulator, a multimedia terminal, a system board which generates a game image, and a portable telephone.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer-readable storage medium storing a program causing a computer to function as:
   a display control section which performs a first display control process which displays an image for proceeding with a game in a first display area, and a second display control process which displays an image that indicates an operation area for which a player should perform a position designation operation in a second display area;
   an input processing section which accepts the position designation operation performed for the operation area as a first input operation;
   a game calculation section which performs game calculations based on the first input operation which has been accepted by the input processing section; and
   a disturbance area setting section which sets a disturbance area in the operation area when a given disturbance condition has been satisfied,
   wherein the input processing section does not accept the position designation operation performed for the disturbance area as the first input operation.

2. The non-transitory computer-readable storage medium storing the program as defined in claim 1,
   wherein the display control section displays an image which represents the disturbance area in the operation area.

3. The non-transitory computer-readable storage medium storing the program as defined in claim 1,
   wherein the disturbance area setting section cancels the disturbance area when a given cancellation condition has been satisfied.

4. The non-transitory computer-readable storage medium storing the program as defined in claim 3,
   wherein the input processing section accepts the position designation operation performed for the disturbance area as a second input operation; and
   wherein the disturbance area setting section cancels the disturbance area based on the accepted second input operation.

5. The non-transitory computer-readable storage medium storing the program as defined in claim 3,
   wherein the input processing section accepts the position designation operation performed for the disturbance area as a second input operation; and wherein the disturbance area setting section moves the disturbance area based on the accepted second input operation.

6. The non-transitory computer-readable storage medium storing the program as defined in claim 3, causing the computer to further function as:
a counter section which counts the passage of time,
wherein the disturbance area setting section cancels the disturbance area when a given period of time has elapsed.

7. The non-transitory computer-readable storage medium storing the program as defined in claim 1, causing the computer to further function as:
an operation area setting section which moves the operation area when a given disturbance condition has been satisfied.

8. The non-transitory computer-readable storage medium storing the program as defined in claim 1, causing the computer to further function as:
a communication control section which exchanges information with an external device,
wherein the communication control section transmits a disturbance setting command to another device based on a calculation result of the game calculation section; and
wherein the disturbance area setting section sets the disturbance area in the operation area based on the disturbance setting command received from the other device.

9. The non-transitory computer-readable storage medium storing the program as defined in claim 8, causing the computer to further function as:
an event control section which controls generation of a disturbance event by which whether or not the disturbance condition has been satisfied is determined,
wherein the event control section prohibits generation of the disturbance event when the disturbance setting command has been transmitted to the other device.

10. The non-transitory computer-readable storage medium storing the program as defined in claim 8, causing the computer to further function as:
an event control section which controls generation of a disturbance event by which whether or not the disturbance condition has been satisfied is determined,
wherein the communication control section transmits disturbance setting information to the other device when the disturbance area setting section has set the disturbance area; and
wherein the event control section prohibits generation of the disturbance event when the disturbance setting information from the other device has been received.

11. The non-transitory computer-readable storage medium storing the program as defined in claim 8,
wherein the communication control section transmits disturbance cancellation information to the other device when the disturbance area setting section has canceled the disturbance area; and
wherein the event control section cancels prohibition of generation of the disturbance event when the disturbance cancellation information from the other device has been received.

12. The non-transitory computer-readable storage medium storing the program as defined in claim 1, causing the computer to further function as:
a music reproduction section which reproduces music data;
a storage section which stores the music data and reference timing data which indicates a reference timing corresponding to music for which the position designation operation should be performed for the operation area; and
an operation data acquisition section which acquires operation timing data which indicates an operation timing when the position designation operation has been accepted as the first input operation,
wherein the display control section displays an image which allows the player to know the reference timing corresponding to the music in the first display area as the first display control process; and
wherein the game calculation section compares the reference timing data with the operation timing data.

13. The non-transitory computer-readable storage medium storing the program as defined in claim 12,
wherein the music reproduction section changes a reproduction state of the music according to the disturbance area set in the operation area.

14. The non-transitory computer-readable storage medium storing the program as defined in claim 1,
wherein the disturbance area setting section sets a plurality of disturbance areas which differ in shape.

15. A non-transitory computer-readable storage medium storing the program as defined in claim 1,
wherein the disturbance area is caused to appear, to move, or to disappear while overlapping the operation area.

16. A non-transitory computer-readable storage medium storing the program causing a computer to function as:
a display control section which performs a first display control process which displays an image for proceeding with a game in a first display area, and a second display control process which displays an image that indicates an operation area for which a player should perform a position designation operation in a second display area;
an input processing section which accepts the position designation operation performed for the operation area as a first input operation;
a game calculation section which performs game calculations based on the first input operation which has been accepted by the input processing section; and
an operation area setting section which moves the operation area when a given disturbance condition has been satisfied.

17. A game system comprising:
a display control section which performs a first display control process which displays an image for proceeding with a game in a first display area, and a second display control process which displays an image that indicates an operation area for which a player should perform a position designation operation in a second display area;
an input processing section which accepts the position designation operation performed for the operation area as a first input operation;
a game calculation section which performs game calculations based on the first input operation which has been accepted by the input processing section; and
a disturbance area setting section which sets a disturbance area in the operation area when a given disturbance condition has been satisfied,
wherein the input processing section does not accept the position designation operation performed for the disturbance area as the first input operation.

18. A method of controlling a game system comprising:
causing a display control section to perform a first display control process which displays an image for proceeding with a game in a first display area, and a second display control process which displays an image that indicates an operation area for which a player should perform a position designation operation in a second display area;

causing an input processing section to accept the position designation operation performed for the operation area as a first input operation;

causing a game calculation section to perform game calculations based on the accepted first input operation; and causing a disturbance area setting section to set a disturbance area in the operation area when a given disturbance condition has been satisfied, wherein the input processing section does not accept the position designation operation performed for the disturbance area as the first input operation.

* * * * *